(12) United States Patent
Shulyak et al.

(10) Patent No.: US 12,423,109 B2
(45) Date of Patent: Sep. 23, 2025

(54) STORING LOAD PREDICTIONS

(71) Applicant: Arm Limited, Cambridge (GB)

(72) Inventors: Alexander Cole Shulyak, Austin, TX (US); Zachary Allen Kingsbury, Austin, TX (US); Bipin Prasad Heremagalur Ramaprasad, Austin, TX (US); Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 33 days.

(21) Appl. No.: 18/588,383

(22) Filed: Feb. 27, 2024

(65) Prior Publication Data

US 2025/0272101 A1    Aug. 28, 2025

(51) Int. Cl.
*G06F 9/38* (2018.01)

(52) U.S. Cl.
CPC .................. *G06F 9/3834* (2013.01)

(58) Field of Classification Search
CPC .............................. G06F 9/3832; G06F 9/3834
See application file for complete search history.

(56) References Cited

U.S. PATENT DOCUMENTS

| | | | | |
|---|---|---|---|---|
| 6,622,237 B1 * | 9/2003 | Keller | ................ | G06F 9/3838 712/216 |
| 6,694,424 B1 | 2/2004 | Keller | | |
| 7,181,598 B2 * | 2/2007 | Jourdan | ................ | G06F 9/3854 712/225 |
| 10,838,729 B1 | 11/2020 | Al-Otoom | | |
| 12,079,126 B2 | 9/2024 | Favor | | |
| 12,086,591 B2 | 9/2024 | Shukla | | |
| 2003/0065909 A1 * | 4/2003 | Jourdan | ................ | G06F 9/3834 712/216 |
| 2004/0044881 A1 * | 3/2004 | Maier | ................ | G06F 9/3834 712/225 |
| 2005/0010744 A1 * | 1/2005 | Filippo | ................ | G06F 9/3834 712/225 |
| 2007/0038846 A1 | 2/2007 | Kadambi | | |

(Continued)

OTHER PUBLICATIONS

U.S. Appl. No. 17/965,275, filed Oct. 13, 2022; Ishii et al.

(Continued)

*Primary Examiner* — Keith E Vicary
(74) *Attorney, Agent, or Firm* — NIXON & VANDERHYE P.C.

(57) ABSTRACT

There is provided an apparatus comprising decoder circuitry to decode store instructions and load instructions. The apparatus includes decoder circuitry to decode store instructions and load instructions. The apparatus also includes prediction circuitry to store load predictions and store predictions. Each load prediction is indexed based on a program counter value of one of the load instructions and comprises information indicative of a predicted store instruction predicted to store data to memory to be subsequently loaded from the memory by that load instruction. Each store prediction is indexed based on the program counter value of one of the store instructions and comprises information indicative of the store instruction being predicted to be indicated as the predicted store instruction in at least one of the plurality of load predictions. Conditions for maintaining the load predictions are different from conditions for maintaining the store predictions.

20 Claims, 16 Drawing Sheets

(56) References Cited

U.S. PATENT DOCUMENTS

| | | | |
|---|---|---|---|
| 2009/0037697 A1* | 2/2009 | Ramani | G06F 9/3834 |
| | | | 712/214 |
| 2010/0049952 A1 | 2/2010 | Eddy | |
| 2011/0040955 A1* | 2/2011 | Hooker | G06F 9/30043 |
| | | | 712/225 |
| 2013/0326198 A1 | 12/2013 | Meier | |
| 2013/0339671 A1 | 12/2013 | Williams, III | |
| 2014/0095814 A1* | 4/2014 | Marden | G06F 9/30043 |
| | | | 711/E12.001 |
| 2014/0108862 A1* | 4/2014 | Rafacz | G06F 9/3842 |
| | | | 712/225 |
| 2014/0143492 A1 | 5/2014 | Eckert | |
| 2014/0181482 A1 | 6/2014 | Smaus | |
| 2014/0325156 A1* | 10/2014 | Ardevol | G06F 9/3842 |
| | | | 711/154 |
| 2018/0052691 A1 | 2/2018 | Dunham | |
| 2024/0126554 A1* | 4/2024 | Ishii | G06F 9/30043 |
| 2024/0338321 A1 | 10/2024 | Ingalls | |

OTHER PUBLICATIONS

Office Action dated Dec. 22, 2023 for U.S. Appl. No. 17/965,275, 17 pages.

Final Office Action dated Apr. 25, 2024 for U.S. Appl. No. 17/965,275, 17 pages.

T. Sha et al, "Scalable Store-Load Forwarding Via Store Queue Index Prediction" Proceedings of the 38th Annual IEEE/ACM International Symposium on Microarchitecture (Micro'OS), Barcelona, Spain, Nov. 2005, 12 pages.

Office Action dated Sep. 25, 2024 for U.S. Appl. No. 17/965,275, 20 pages.

Office Action dated Apr. 8, 2025 for U.S. Appl. No. 17/965,275, 17 pages.

* cited by examiner

| Instruction | No renaming | With renaming | Comment |
|---|---|---|---|
| ADD x1, x0, #1 | ADD p1, p0, #1 | ADD p1, p0, #1 | Producer operation (p1 is destination register) |
| ... | ... | ... | |
| STR x1, [...] | STR p1, [...] | STR p1, [...] | Store operation providing data for future load |
| ... | ... | ... | |
| LDR x2, [...] | LDR p2, [...] | LDR_check [ ] | Load operation consuming data from store |
| ... | ... | ... | |
| SUB x3, x2, #1 | SUB p3, p2, #1 | SUB p3, p1, #1 | Consumer operation |

Good_example: PC=X should forward data to LD

STR x1, [x0]  // PC=X, PC_hash(X)=10

...

STR x3, [x2]  // PC=Y, PC_hash(Y)=12

...

LDR x5, [x4]  // depend on #HashedPC=10

FIG. 3A

Hash_Conflict:

STR x1, [x0]  // PC=X, PC_hash(X)=10

...

STR x3, [x2]  // PC=Y, PC_hash(Y)=10

...

LDR x5, [x4]  // depend on #HashedPC=10

FIG. 3B

Same_Instruction:

STR x1, [x0]  // PC=X, PC_hash(X)=10

... (loop) ...

STR x1, [x0]  // PC=X, PC_hash(X)=10

...

LDR x5, [x4]  // depend on #HashedPC=10

FIG. 3C

Store buffer 700

| UID | Store VA | Store PC | Hash(PC) | Predicted store? |
|---|---|---|---|---|
| 20 | 0x1000 | 0xB000 | #32 | X |
| 22 | 0x1100 | 0xFFF0 | #21 | 0 |
| 28 | 0x1200 | 0xB000 | #32 | 1 |
| 31 | 0x2000 | 0xEEE0 | #21 | 1 |
| 33 | 0x1000 | 0xC000 | #10 | 0 |
| 40 | 0x1100 | 0xB000 | #32 | 0 |

FIG. 7

STORING LOAD PREDICTIONS

TECHNICAL FIELD

The present invention relates to data processing. More particularly the present invention relates to an apparatus, a chip containing product, a system, a method, and a non-transitory computer-readable medium.

BACKGROUND

Some data processing apparatuses are responsive to store instructions to store data to memory and load instructions to retrieve data from memory. Storing and loading data can result in delays to processing operations carried out by the data processing apparatus.

SUMMARY

According to a first aspect of the present techniques there is provided an apparatus comprising:
  decoder circuitry configured to decode store instructions and to decode load instructions;
  prediction circuitry configured to store a plurality of load predictions and a plurality of store predictions, each of the plurality of load predictions indexed based on a program counter value of one of the load instructions and comprising information indicative of a predicted store instruction predicted to store data to memory to be subsequently loaded from the memory by that one of the load instructions, each of the plurality of store predictions indexed based on the program counter value of one of the store instructions and comprising information indicative of that one of the store instructions being predicted to be indicated as the predicted store instruction in at least one of the plurality of load predictions,
  wherein conditions for maintaining the plurality of load predictions are different from conditions for maintaining the plurality of store predictions.

According to a second aspect of the present techniques there is provided a system comprising:
  the apparatus of the first aspect, implemented in at least one packaged chip;
  at least one system component; and
  a board,
  wherein the at least one packaged chip and the at least one system component are assembled on the board.

According to a third aspect of the present techniques there is provided a chip-containing product comprising the system of the second aspect assembled on a further board with at least one other product component.

According to a fourth aspect of the present techniques there is provided a method comprising:
  decoding store instructions and decoding load instructions;
  storing a plurality of load predictions and a plurality of store predictions, each of the plurality of load predictions indexed based on a program counter value of one of the load instructions and comprising information indicative of a predicted store instruction predicted to store data to memory to be subsequently loaded from the memory by that one of the load instructions, each of the plurality of store predictions indexed based on the program counter value of one of the store instructions and comprising information indicative of that one of the store instructions being predicted to be indicated as the predicted store instruction in one of the plurality of load predictions,
  wherein conditions for maintaining the plurality of load predictions are different from conditions for maintaining the plurality of store predictions.

According to a fifth aspect of the present techniques there is provided a non-transitory computer-readable medium to store computer-readable code for fabrication of an apparatus comprising:
  decoder circuitry configured to decode store instructions and to decode load instructions;
  prediction circuitry configured to store a plurality of load predictions and a plurality of store predictions, each of the plurality of load predictions indexed based on a program counter value of one of the load instructions and comprising information indicative of a predicted store instruction predicted to store data to memory to be subsequently loaded from the memory by that one of the load instructions, each of the plurality of store predictions indexed based on the program counter value of one of the store instructions and comprising information indicative of that one of the store instructions being predicted to be indicated as the predicted store instruction in at least one of the plurality of load predictions,
  wherein conditions for maintaining the plurality of load predictions are different from conditions for maintaining the plurality of store predictions.

BRIEF DESCRIPTION OF THE DRAWINGS

The present invention will be described further, by way of example only, with reference to configurations thereof as illustrated in the accompanying drawings, in which:

FIG. 2 schematically illustrates an example sequence of instructions that may be used in some configurations of the present techniques;

FIG. 3A schematically illustrates an example sequence of instructions that may be used in some configurations of the present techniques;

FIG. 3B schematically illustrates an example sequence of instructions that may be used in some configurations of the present techniques;

FIG. 3C schematically illustrates an example sequence of instructions that may be used in some configurations of the present techniques;

FIG. 7 schematically illustrates a store buffer according to some configurations of the present techniques;

DESCRIPTION OF EXAMPLE CONFIGURATIONS

Figure 1:
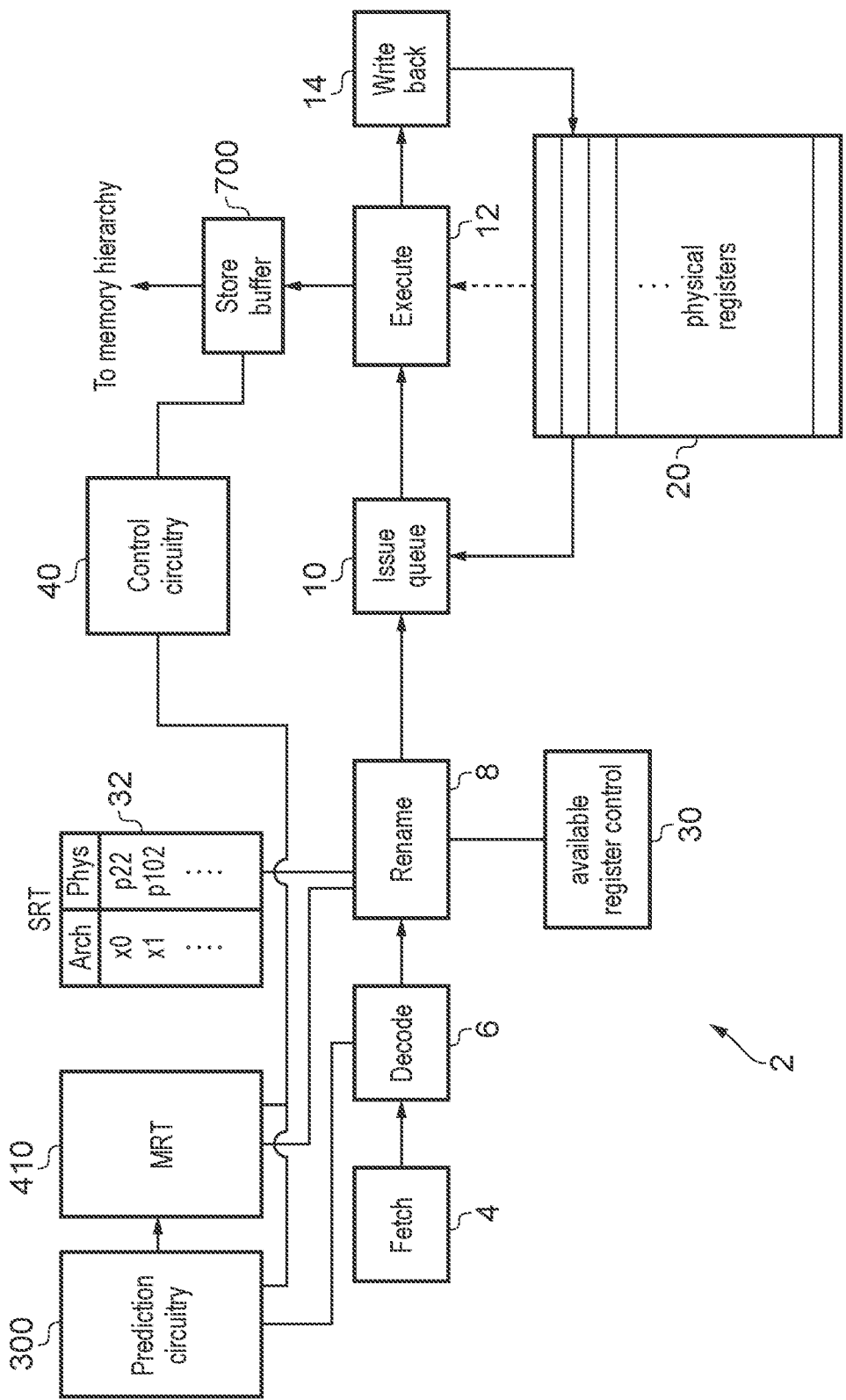
FIG. 1 schematically illustrates an apparatus according to some configurations of the present techniques.

Before discussing the configurations with reference to the accompanying figures, the following description of configurations is provided.

Some apparatuses (e.g., some data processing apparatuses) are responsive to store instructions to store data to memory and load instructions to load data from memory. Such load and store instructions can result in increased latency for an apparatus, for example, if the load instructions and/or the store instructions lie on a critical execution path.

In some use cases, a store instruction may be used to store data to memory and then, subsequently, that same data might be loaded from memory. Such cases can result in a delay resulting from the store and a subsequent delay resulting from the load. One technique that can help to mitigate against these delays is memory renaming. Memory renaming involves predicting, for each load instruction, whether that load instruction loads recently stored data. In response to such a prediction, the data to be loaded may be retrieved without requesting the data from memory. For example, the data may be obtained from local storage circuitry provided between the apparatus and the memory.

In some configurations there is provided an apparatus comprising decoder circuitry configured to decode store instructions and to decode load instructions. The apparatus comprises prediction circuitry configured to store a plurality of load predictions and a plurality of store predictions. Each of the plurality of load predictions is indexed based on a program counter value of one of the load instructions and comprises information indicative of a predicted store instruction predicted to store data to memory to be subsequently loaded from the memory by that one of the load instructions. Each of the plurality of store predictions is indexed based on the program counter value of one of the store instructions and comprises information indicative of that one of the store instructions being predicted to be indicated as the predicted store instruction in at least one of the plurality of load predictions. Conditions for maintaining the plurality of load predictions are different from conditions for maintaining the plurality of store predictions.

The apparatus is provided with predictor circuitry to enable the identification of instructions that are predicted to be involved in a load-store forwarding operation. A load-store forwarding operation as referred to herein is defined as an operation in which a load operation to load a data item follows a store operation to store that data item and that the delay (for example, measured in instruction cycles) between the store instruction and the load instruction is sufficiently small that the load instruction is able to take advantage of a locally stored copy of that data item without having to retrieve the data item from memory.

Whilst a load-store forwarding operation can be predicted based entirely on load predictions that indicate load instructions predicted to be part of the load-store forwarding operation, the inventors have recognised that such an approach requires that every store operation is treated as potentially being part of a load-store forwarding operation increasing the amount of resources used by the apparatus. The apparatus is therefore provided with prediction circuitry to store both load predictions and store predictions. Entries of the prediction circuitry are identified based on a program counter of the load or store instruction. For a store instruction, the prediction circuitry stores information identifying that the store instruction is predicted to be part of a load-store forwarding operation. This information may be associated with the store instruction to enable circuitry used later in execution of the store instruction to identify that the store instruction is predicted to be part of a load-store forwarding operation. For a load instruction, the prediction circuitry stores information identifying that the load instruction is predicted to be part of a load-store forwarding operation and includes information identifying the store instruction that is predicted to be involved in that particular load-store forwarding operation.

The conditions for maintaining the plurality of load predictions in the prediction circuitry are different from conditions for maintaining the plurality of store predictions in the prediction circuitry. In other words, a load prediction may be present in the prediction circuitry without a corresponding store prediction also being present. Maintaining load predictions independently of the corresponding store predictions allows space in the prediction circuitry to be conserved resulting in a reduced circuit area for the prediction circuitry. Load predictions that are stored without a corresponding store prediction may be used either for training of the load predictions, for example to ensure that a predefined number of load-store forwarding operations based on that load prediction occurs before the store prediction is allocated, or to trigger allocation of a trained load-store forwarding prediction.

In some configurations the apparatus comprises control circuitry configured to: trigger allocation of a new load prediction in the prediction circuitry in response to a load allocation determination that one of the load instructions having a program counter value that misses in the prediction circuitry loads data that has been stored by a preceding store instruction identified from a group of recently executed store instructions; and trigger allocation of a store prediction into the prediction circuitry in response to a store allocation determination that a load forwarding condition is met by an executed load instruction having a program counter value that hits on a previously allocated load prediction of the plurality of load predictions.

The allocation of load predictions identifying load instructions and store predictions identifying store instructions into the prediction circuitry is dependent on observation of load-store forwarding operations involving those load instructions and those store instructions. A load prediction for a load prediction corresponding to a load instruction is allocated into the prediction circuitry when it is determined that two criteria are met. First, the load instruction is identified as a load instruction that is not present in the prediction circuitry, i.e., that when the program counter associated with the load instruction was used to perform a lookup in the prediction circuitry, the lookup missed in the prediction circuitry. This condition may be satisfied when the load instruction is neither a predicted load nor, in some configurations, already present in the prediction circuitry as a training entry. Secondly, the load instruction is identified as loading data that was stored to memory by a recently executing store instruction, e.g., such that if the load instruction and the store instruction had been predicted then a successful load-store forwarding operation could have been carried out.

A store allocation for a store instruction is allocated into the prediction circuitry when it is determined that a load forwarding condition has been met by an executed load instruction having a program counter value that, when a lookup in the prediction circuitry was performed based on that program counter value, resulted in a hit in the prediction circuitry. In other words, for a given combination of a load and a store for which a successful load-store forwarding operation could be achieved, a store prediction identifying the store instruction is allocated into the prediction circuitry once a load prediction corresponding to the given combination is already present in the prediction circuitry and that load instruction meets the load forwarding condition. By sequentially allocating the load prediction and then, subsequently, the store prediction, space in the prediction circuitry can be conserved with store predictions only being allocated once there is a reasonable chance that the store instruction will be useful for a load-store forwarding operation.

In some configurations the decoder circuitry is responsive to receipt of one of the store instructions, to trigger a store prediction lookup in the prediction circuitry and to mark that one of the store instructions as being in a predicted store state in response to the store prediction lookup hitting in the prediction circuitry; and the apparatus comprises storage circuitry to store a memory rename table comprising rename table entries, each of the rename table entries identifying one of the store instructions marked as being in the predicted store state, and associating that one of the store instructions with a source physical register identified by that one of the store instructions. The data processing apparatus may be arranged as a data processing pipeline including a plurality of pipeline stages. The prediction circuitry may be provided at an earlier stage of the pipeline than the rename table. The rename table may be provided, for example, as part of a rename stage configured to perform register renaming to allocate a set of defined architectural registers to a set of physical registers.

In some configurations the apparatus comprises rename circuitry responsive to receipt of one of the store instructions marked as being in the predicted store state, to trigger allocation of an entry in the rename table specifying the source physical register identified by that one of the store instructions. For example, the rename circuitry may consult a speculative rename table identifying a current speculative mapping between architectural registers defined in instructions to the physical registers used during execution of those instructions. When a store instruction specifying a source architectural register is received, the memory rename table may perform a lookup in the speculative rename table to identify a corresponding physical register that is currently mapped to the specified source architectural register. The corresponding physical register can then be identified in the store instruction for use during execution (e.g., in place of the architectural register identification). If the store instruction is marked as a predicted store, then the source physical register is stored in the rename table in association with the store identifying information. The physical register can therefore be reserved so that the data stored therein can be read by a load instruction as part of the load-store forwarding operation in response to a later received load instruction predicted as corresponding to that store instruction.

Whilst the store instructions marked as being in the predicted store state may result in allocation into the memory rename table, in some configurations the rename circuitry is responsive to receipt of one of the store instructions which has not been marked being in the predicted store state, to omit allocation of the entry in the memory rename table. Omitting the allocation for store instructions that have not been identified as being predicted store instructions reduces the amount of space required in the memory rename table and reduces the total number of physical registers that may be reserved for memory renaming at any one time.

In some configurations the rename circuitry is responsive to receipt of one of the store instructions, prior to performing any allocation associated with that one of the store instructions, to perform a rename lookup in the rename table and to trigger invalidation of an existing entry in the rename table identified in the rename lookup. A pre-existing entry in the rename table may either be present as a result of a preceding successful load-store forwarding operation or as a result of a previous occurrence of a store instruction having identifying information corresponding to the received store instruction. This may either be a previous occurrence of the same store instruction at a same program counter value, for example, as a result of a loop in the program code, or an occurrence of a previous store instruction having a different program counter value that, e.g., coincidentally, results in the same lookup information (e.g., a hash of the program counter value) as the current store instruction. As a result, a non-predicted store will not be present as a valid entry in the rename table. Advantageously, when an expected store does not occur (was not executed) before a predicted load, the load will not result in a hit in the rename table allowing the rename circuitry to identify that a load-store forwarding operation is not to be carried out for the predicted load. This allows the load to be fulfilled using other mechanisms (e.g., loading the data from memory or retrieving it from the store buffer) and avoids the potential need to flush the pipeline as a result of an incorrect store being identified as being associated with that load.

In some configurations the prediction circuitry is configured to store, for each one of the plurality of load predictions, prediction state information identifying whether that one of the load predictions is in a predictive state; and the load forwarding condition requires that the previously allocated load prediction is in the predictive state. The predictive state may be one of a plurality of possible states that can be represented by the prediction state information. For example, the prediction state may also indicate that the load prediction is in a training state and/or in an invalid state. The load prediction may be initially allocated in a training state which is changed to a predictive state once a confidence in the prediction reaches a predetermined (or programmable) threshold. Advantageously, there is no need to allocate store predictions in the prediction circuitry until the load instruction is indicated as being in the predictive state.

In some configurations the decoder circuitry is configured: in response to receipt of a load instruction of the load instructions, to trigger a load prediction lookup in the prediction circuitry; and in response to the load prediction lookup resulting in a hit one of the plurality of load predictions in the predictive state, to mark the load instruction as being in a predicted load state and to associate the information indicative of the predicted store instruction identified in that one of the plurality of load predictions with the load instruction. Where the load prediction is not in the predictive state, e.g., because it is in a training state or an invalid state, the load instruction may progress without being marked as being in a predicted load state. The terms "predicted load state" and "predicted store state" may each refer to an entry in the prediction circuitry that is in a predictive state. The indication that the instruction is in a predictive state may be identical for the predicted load state and the predicted store state with the terms being used herein to indicate that the instruction being referred to is either a load instruction or a store instruction. The load instruction in the predicted load state is associated with information identifying the store instruction that is identified in the load prediction. The load instruction is therefore marked with information identifying the instruction that is predicted to have stored the data that will be loaded by that load instruction.

In some configurations the rename circuitry is responsive to receipt of the load instruction marked as being in the predicted load state to perform a load rename lookup in the memory rename table based on the information indicative of the predicted store instruction associated with the load instruction; the rename circuitry is responsive to the load rename lookup hitting on a target entry in the memory rename table, to set a destination physical register of the load instruction to the source physical register identified in the target entry; and the rename circuitry is responsive to the load rename lookup missing in the memory rename table, to mark the load instruction as being in a store-allocate state. As discussed, a load instruction in the predicted load state is one for which it is expected that a load-store forwarding operation will be successful. However, the store instruction may at this stage not have been allocated as a store prediction into the prediction circuitry. As a result, there may not be a corresponding store instruction identified in the memory rename table. When the rename table identifies a store instruction in the rename table, a successful load-store forwarding operation may be possible. In such a case, the rename circuitry sets the destination register of the load instruction (the physical register into which the data will be loaded) as the source physical register containing the data to be stored by the associated store instruction. This effectively means that the load instruction can be considered complete without the load instruction actually being executed and before the store instruction has completed. Any subsequent instructions requiring the data that was to be loaded by the load instruction will automatically have their source physical registers set to the destination physical register of the load instruction through register renaming techniques once they reach the rename circuitry. Where the load rename lookup in the memory rename table results in a miss, the store instruction associated with that load instruction has either not occurred or has not yet been allocated to the prediction circuitry. In such a case, the load instruction is marked as being in a store-allocate state to indicate to circuitry elsewhere in the apparatus that a store instruction corresponding to that load instruction can be allocated into the prediction circuitry. An additional benefit to this approach is that, due to the separate mechanisms provided for store prediction allocation and load prediction allocation, resilience to thrashing of the prediction circuitry is increased. Because of the reduced dependency of the store predictions and the load predictions, one may be evicted without the other being aware. If the predicted load entry is evicted, then prediction ceases until that entry can be reallocated in a predictive state. If the predicted store entry is evicted, then the store instruction will invalidate the entry in the memory rename table and the predicted load will result in a memory rename table miss. Because a predicted load missing in the rename circuitry transitions to the store-allocate state, an incorrect eviction of a store prediction can allow that store instruction to be quickly reallocated into the prediction circuitry.

The memory rename table can be configured in any manner. For example, the memory rename table may be configured as a direct-mapped storage structure with each entry identified based on an index. In some configurations the memory rename table is configured as a set associative storage structure having associativity greater than one; each of the entries of the memory rename table is tagged based on the information indicative of the one of the predicted store instructions indicated in that one of the entries. The set associative storage structure may be a fully associative storage structure. In contrast to a direct-mapped storage structure, where multiple different sets of identifying information may alias (for example, as a result of a hash algorithm) to a same entry of the storage structure, the use of a set-associative cache allows multiple entries having a same index to co-exist in the storage structure. As a result, a set associative storage structure allows for a smaller storage structure to be used resulting in a reduced circuit area. Furthermore, because multiple entries having the same index can be stored, the use of a set associative storage structure reduces the likelihood of thrashing.

In some configurations the load forwarding condition requires a confirmation that the executed load instruction loads data that has been stored by the predicted store instruction indicated in the previously allocated load prediction. The prediction of a predicted load that results in a hit in the memory rename table does not always guarantee that the load instruction will load the same data that was stored by the store instruction. For example, whilst the occurrences of the load instruction and the store instruction that resulted in the allocation of the load prediction and the store prediction into the prediction circuitry may have indicated that the load instruction loaded the data stored by the store instruction, in the current iteration this may not be the case. This may be due to changes in the program flow or a change in a pointer indicating either the address to which the store instruction is to store data or the address from which the load instruction loads the data. Hence, in some configurations, the load instruction may be allowed to partially execute to determine whether the data stored by the store instruction is indeed the data that is being loaded by the load instruction. This confirmation can be performed independently of the load-store forwarding operation, e.g., the execution of one or more instructions subsequent to the load instruction may be allowed to continue (e.g., speculatively) whilst the confirmation is pending. As a result, the confirmation does not result in any increased latency.

In some configurations the apparatus comprises a store buffer configured to store, as the group of recently executed store instructions, pending store request information of each pending store instruction, the pending store request information comprising a memory address to which that pending store instruction stores data, wherein the confirmation is determined through comparison of the predicted store instruction indicated in the previously allocated load prediction with the pending store request information. The store buffer identifies, for each pending store request, an indication of the memory address that the data is being stored to.

By using information indicative of the predicted store instruction indicated in the previously allocated load prediction, a store request in the store buffer can be identified corresponding to the predicted store. The memory address information in the store request is then compared against memory address information associated with the load instruction that is predicted by the previously allocated load prediction. In other words, the memory address from which the load instruction is going to load the data is checked against the memory address to which the store instruction is going to store the data.

The aforementioned check based on the store buffer can be used to determine whether a predicted load-store forwarding operation has been correctly predicted. In addition, the same approach can be used to perform the initial allocation of the new load prediction. In some configurations the control circuitry is configured to perform the load allocation determination based on analysis of at least partial execution of the load instructions to determine whether the data written by one of the store instructions is read by the load instructions based on the memory address comprised in the pending store request information of each pending store instruction. For each pending non-predicted load instruction, the control circuitry may perform the load allocation determination to identify if that pending load instruction could have benefited from a load-store forwarding operation. When the load instruction could have benefited from a load-store forwarding operation, the control circuitry triggers the prediction circuitry to allocate a new load prediction based on the load instruction. The prediction circuitry may respond to the trigger by allocating the new load prediction. In some configurations, the prediction circuitry may respond to the trigger by performing a lookup in the prediction circuitry to determine if an entry (e.g., in a non-predictive state) is already present for the load instruction and, if so, to increase a confidence associated with that load prediction. In some configurations, if the confidence increases above a predefined confidence threshold, the prediction circuitry may mark that load prediction as being in the predictive state.

In some configurations the control circuitry is configured to perform the store allocation determination based on an identification that the executed load instruction is indicated as being in the store-allocate state and that the executed load instruction reads data written by the predicted store instruction indicated in the executed load instruction. As discussed, a load instruction that is indicated as being in the store-allocate state is a load instruction that has resulted in a hit in the prediction circuitry on a load prediction in a predictive state, but where the memory rename table does not have a corresponding store instruction to associate with the load instruction. In response to receipt of such a load instruction, the control circuitry performs the determination of whether the load instruction could have benefited from a load-store forwarding operation, e.g., if there is the store instruction specified by the load prediction is present in the store buffer and if the store instruction stores data to the address identified in the load instruction, then the control circuitry triggers the prediction circuitry to allocate a store prediction specifying the store instruction.

In some configurations the control circuitry is responsive to the load prediction being in a predicted load state, to determine whether the load prediction is accurate through comparison of the load prediction and the pending store request information; and the control circuitry is responsive to a determination that the load prediction is accurate, to cancel execution of the load instruction. The determination as to whether the load prediction is accurate may comprise determining if the address from which the data is to be loaded by the load instruction is the same as the address to which the data has been stored by the store instruction identified in the load prediction. When the addresses are the same, the load prediction may be determined to be accurate. In some configurations the check may also comprise determining if there are any store instructions that are younger than the store instruction identified in the load prediction that write data to the same address as the address from which data is to be loaded by the load instruction. When there are no such intervening store instructions, then the load prediction may be determined to be accurate. When it has been determined that the load prediction is accurate, the load-store forwarding operation will carry out correctly and the load instruction can be cancelled, e.g., before a request to retrieve the data from the address indicated in the load instruction is sent to memory.

In some configurations the control circuitry is responsive to a determination that the load prediction is not accurate to signal a misprediction and to flush the load instruction; and the prediction circuitry is responsive to the misprediction, to cause the load prediction to transition out of the predicted load state. Where it is determined that the load prediction is not accurate, e.g., because the store instruction identified in the load prediction stores data to a different address to the one identified in the load instruction, or because there is an intervening store instruction that is younger than the store instruction identified in the load prediction but that stores data to the same address as the store instruction identified in the load prediction, then the load instruction is allowed to continue to retrieve the correct through a different mechanism. The different mechanism may involve retrieving the data from the store buffer or retrieving the data from the memory hierarchy. However, because the determination may have been carried out in parallel to the continued execution of instructions by processing circuitry, the control circuitry triggers the processing pipeline to flush the load instruction (and any instructions occurring subsequent to the load instruction) from the processing circuitry and to replay those instructions without the load-store forwarding operation. The retrieval of data from the address specified in the load instruction can continue whilst the flush is being carried out in preparation for the instruction to be replayed. Where the load prediction in the predicted load state and the prediction is determined to be inaccurate, the control circuitry causes the prediction circuitry to update the load prediction so that it is no longer in the predictive load state. This may involve invalidating the load prediction, or returning the load prediction to a training state.

In some configurations the store buffer is configured to store, for each pending store instruction indicated in one of the plurality of store predictions, predicted store identifying information. The predicted store identifying information may be any information that can be used to identify the store prediction. For example, the predicted store identifying information may comprise a program counter value, and/or a hash of a program counter value.

In some configurations the store buffer comprises an extended store buffer configured to retain completed store request information of one or more completed store instructions; the control circuitry is configured to determine whether the data written by one of the store instructions is read by the load instructions based on the memory address comprised in the completed store request information of each of the one or more completed store instructions; and the control circuitry is configured: to allocate the completed store request information to the extended store buffer when allocation of the completed store request will result in at least one entry of the extended store buffer comprising the predicted store identifying information; and to omit allocation of the completed store request information to the extended buffer storage when allocation of the completed store request will result in no entries of the extended store buffer comprising the predicted store identifying information. Utilising the store buffer for allocation and confirmation of the load-store forwarding operations provides for a circuit area efficient implementation. Typically, the store buffer retains information of pending store instructions until those pending store instructions have completed. The use of the store buffer places a limit on the distance between load instructions and store instructions that are able to participate in a load-store forwarding operation. Provision of the extended store buffer allows a greater number of stores to be retained which increases the maximum distance between load instructions and store instructions that are able to participate in the load-store forwarding operation. The extended store buffer retains store instructions that are able to participate in a load-store forwarding operation. The store buffer stores instructions that may either include predicted store identifying information (e.g., that have been identified as a predicted store earlier during processing by the prediction circuitry), or that do not include predicted store identifying information. When a store instruction completes, and is evicted from the store buffer, it is determined if the allocation of that store instruction into the extended store buffer would result in there being any store instruction in the extended store buffer that include predicted store identifying information. In other words, it is determined if the store instruction to be allocated includes predicted store identifying information, or if there is at least one existing entry in the extended store buffer (excluding the oldest entry in the extended store buffer) that includes predicted store identifying information. If the allocation of the completed store instruction would result in an extended store buffer having no entries that include the predicted store identifying information, then the allocation may be skipped to save power. In some configurations, the extended store buffer may also be clock gated or power gated to save power consumption. If however, the allocation of the completed store instruction would result in at least one entry in the extended store buffer having predicted store identifying information, then the completed store instruction is allocated and the extended store buffer allows the control circuitry to determine if a load-store forwarding operation is possible (or has been correctly predicted) over a greater distance (number of instructions or instruction cycles) between a load instruction and a store instruction.

Particular configurations will now be described with reference to the figures.

FIG. 1 schematically illustrates a portion of a processing pipeline in an apparatus (a data processing apparatus) 2. The pipeline includes a number of stages including a fetch stage 4, a decode stage 6, a rename stage 8, an issue stage 10, an execute stage 12 and a write back stage 14. Instructions to be processed move from stage to stage, and one instruction may be pending at one stage of the pipeline while another instruction is pending at a different stage. It will be appreciated that this is just one example of a possible pipeline and other examples may have other stages or arrangements.

The fetch stage 4 fetches program instructions from an instruction cache or memory. The decode stage 6 decodes the fetched instructions to generate decoded instructions which are passed to the rest of the pipeline for processing. For some instructions, a single instruction fetched from memory may be decoded into a single decoded instruction passed down the pipeline. However, for other more complex instructions, a single fetched instruction may be decoded into multiple decoded instructions known as "micro-operations". For example, an instruction for triggering a series of operations to be performed (such as a load multiple instruction) may be decoded into individual micro-operations each corresponding to one of the operations. Therefore, the "instructions" as seen by the later stages 8, 10, 12, 14 of the pipeline may be different from the instructions fetched from memory and the term "instruction" should be interpreted as encompassing a micro-operation. In these examples, the decode stage 6 is aided by prediction circuitry 300, which is used to predict whether store/load forwarding could occur. Store/load forwarding is a technique used for 'eliminating' the need to store data to memory and then to re-read it back from memory. The prediction in turn sets up a Memory Renaming Table (MRT) 410, which is used by the rename stage 8 to implement the store/load forwarding as will be discussed in further detail below.

The apparatus 2 has a number of physical registers 20 available for storing data values. A memory renaming stage 8 performs register renaming for the decoded instructions (or micro operations) to map architectural register specifiers specified by the instructions to physical register specifiers identifying one of the physical registers 20. The instruction set architecture may support a certain number of architectural registers which are visible to the programmer. For example, a 4-bit or 5-bit register field in the instruction encoding may specify one of 16 or 32 different architectural register specifiers. However, to allow hazards between instructions specifying the same architectural register specifier to be resolved or to permit out of order or parallel processing of instructions, a greater number of physical registers may be provided, and the memory rename stage 8 may map the architectural register specifiers in the decoded instructions to corresponding physical registers. For example, two instructions operating on unrelated data items (i.e., such that there is no data dependency between those two instructions) but that specify a same set of architectural registers, may be executed either in parallel or out of sequence with reference to one another by mapping the architectural registers to a different set of physical registers for each of the two instructions.

The renamed instructions now specifying physical register specifiers are passed to the issue queue 10 where they are queued while awaiting execution. Instructions remain in the issue queue until their operands are available, at which point the instruction is issued to the execute stage 12 for execution. Instructions may be issued for execution in a different order to the original program order in which they were fetched by the fetch stage 4. For example, while one instruction is stalled because its operands are not yet available, a later instruction whose operands are available may be issued first.

The execute stage 12 may include various processing units for executing processing operations in response to instructions. For example, the processing units may include an arithmetic/logic unit (ALU) for performing arithmetic or logical operations, a load/store unit to perform load operations for loading a data value from memory and placing it in a physical register or store operations for storing to memory a data value currently stored in a physical register, a vector processing unit for performing vector operations on data values comprising multiple data elements, floating-point circuitry for performing operations on floating-point values, or any other type of processing circuitry. In some cases, the execute stage 12 may include a number of parallel execution pipelines for processing different kinds of instructions. In these examples, a store buffer 700 is provided to buffer store operations on their way to the memory hierarchy.

When execution of the instruction is complete in the execute stage 12, the instruction is passed to the write back stage 14, which writes a result of the instruction to a physical register 20.

In the example shown in FIG. 1, for renamed instructions which specify one or more physical registers from which data values are to be read, the reading of the physical register takes place while the instruction is pending in the issue queue 10. However, other embodiments may read the physical registers 20 at the execute stage 12 instead, as shown by the dotted line in FIG. 1.

Available register control circuitry 30 is provided for controlling which of the physical registers can be selected by the memory rename stage 8 for mapping to an architectural register specifier. In general, the available register control circuitry 30 may provide the memory rename stage 8 with an indication of which physical registers are available or unavailable for selection, for example, through provision of a free list comprising a single bit for each register identifying whether that register is available or unavailable for selection. When an instruction which writes to a register is received from the decode stage 6, the memory rename stage 8 generates a new register mapping for the architectural register specified as the destination register for the instruction, such a mapping is maintained in a Speculative Rename Table 32 (SRT) maintained by (e.g., stored in or on behalf of) the memory rename stage 8. The rename stage 8 selects a physical register which is indicated as available by the available register control circuitry 30 and updates the SRT 32 to include a rename entry mapping the destination architectural specifier to the selected physical register. The mapping between architectural and physical registers for all instructions present in the processing pipeline may be maintained using one or more other tables for example, an Architectural Rename Table (ART) indicating the mapping between physical and architectural registers at the write back stage 14, and a Register Commit Queue (RCQ) indicating sequential updates to the mapping that, in combination with a ReOrder Buffer (ROB) enables the mapping between registers for any instruction at any point in the pipeline to be established. Techniques for maintaining the mapping between architectural registers and physical registers would be known to the person skilled in the art and it would be readily apparent that alternative mapping schemes and methods of tracking those mappings could be used.

The pipeline 2 supports speculative execution of instructions. Some instructions may be executed speculatively before it is known whether the instruction should be executed, or before it is certain that the result of the instruction will be valid. For example, following a branch instruction, some instructions may be executed speculatively based on a prediction of whether the branch is taken or not taken, before the actual branch outcome is known. When the speculation is correct, speculative execution can improve performance by eliminating a delay which would arise if the instruction was not executed until after it is known that the instruction should have executed or that its result will be valid. However, if the speculation turns out to be incorrect, then execution of the instruction may need to be cancelled and architectural state may need to be restored to the last valid state.

The MRT 410 stores information indicative of store instructions that are predicted to take part in a load-store forwarding operation. Control circuitry 40 is also provided to aid in generating entries for the prediction circuitry 300 and to confirm the accuracy of load-store forwarding operations predicted by the prediction circuitry 300. The behaviour of the control circuitry 40 will be described in further detail below and the MRT 410, in combination with their role in load-store forwarding operations will be described in further detail below.

It will be appreciated that FIG. 1 is merely an example illustration of one possible pipeline and that other pipelines may also be applicable to the present technique. In particular, the rename stage 8 may be optional and the use of the MRT 410 could take place at the decode stage instead.

FIG. 2 schematically illustrates two examples of store/load forwarding. The stream of instructions 200 includes a producer instruction that produces some data. In this case, the producer instruction is an ADD instruction that takes a value stored in register x0, adds 1, and then stores the value in register x1. The data that is produced is therefore the value that is stored in register x1. Note that the registers being referred to here are architectural registers. That is, these are not the designations of physical registers but are instead symbolic names.

Later in the stream of instructions 200, a store instruction STR stores the value in register x1 to some memory address (the actual address is unimportant). Then, later in the stream 200. Later still, a load instruction LDR loads the value from the same memory address and stores the result in register x2. Finally, in the stream 200 is a consumer instruction in the form of subtract instruction SUB. This takes the value stored in register x2, subtracts 1, and then stores the result in register x3.

Store/load forwarding takes advantage of the fact that in situations like this there is, technically, no need for the data to be reloaded from memory. Memory operations are slow (even with the use of caches) and so avoiding memory accesses not only improves the instruction processing rate, but also reduces memory bandwidth and energy consumed in accessing the memory hierarchy.

One way of achieving store/load forwarding is with the use of a store buffer, which is a structure used to store data before it is sent out to the memory system. If the data is stored within the store buffer, then it may be accessed directly from that. The modified instructions for this technique are shown in the column "no renaming". The term here means that register renaming is not used to achieve store/load forwarding (not that no mapping between architectural and physical registers is performed at all). Indeed, it can be seen that a mapping between the architectural registers and physical registers is performed with the assigned physical registers being denoted with the symbol p (p1, p0, etc.). The store/load forwarding takes place entirely in the hardware in this example, and so the instructions need not be modified at all.

A second way of achieving store/load forwarding is by taking advantage of the observation that the data to be accessed by the load instruction LDR could be kept in the physical register used by the store instruction STR. In this situation, the ADD and STR instruction are unchanged except for the assignment of physical registers in place of the architectural registers specified in those instructions. The consumer instruction SUB, however, now accesses the register p1 rather than the register p2 into which the LDR instruction would have loaded the data after retrieving it from memory. The LDR instruction is still issued as usual.

However, as part of this process, the load operation checks that the data that is to be loaded by the load instruction is the same as the data that is to be stored in the register p1. The reason for performing such a check is that it is not known for certain whether the same data is being used in each case without analysing the memory addresses being accessed and whether there are any intervening store instructions that store to the same address as the instructions illustrated in FIG. 2. This in turn cannot be determined until execution time and performing this analysis would require multiple processor cycles to establish. Consequently, a prediction is made and the register renaming passes the data over via the registers in a 'speculative' manner. If the check reveals that the wrong data was provided, then a flush occurs in order to rewind the execution and the load instruction is performed normally. Details of this checking process are shown below.

Although not illustrated in the figure, another technique that can be used is to decode the load instruction LDR with a move operation that copies the data from the register specified by the store instruction to a register specified by the load instruction. So in this example, the store instruction STR x1, [ . . . ] followed by the load instruction LDR x2, [ . . . ] would result in the decoding of the load instruction to the operation equivalent to MOV x2 x1 (i.e. copy the data from x1 to x2).

Regardless of the technique used to perform the forwarding, it is necessary to both detect the relationship between the load/store address and to store it. Prediction can be achieved by recording, for program counter values at which a store occurred, the address that was accessed. When load instructions are executed, they can consult this table and determine whether the same memory address is being accessed. This can be achieved at, for instance, the store buffer 700 as will be described below.

Once an initial pairing has been established, then a confidence that the two program counter values are linked can be maintained. When the confidence is above some threshold, the link between the two instructions can be relied upon and one of the above two techniques for store/load forwarding can be applied. Similarly, if the confidence drops below another threshold then the entry might be deleted.

A problem arises in how to correlate the store and load values together. One possibility is simply to provide a fully associative table containing associations between load and store instructions. However, this would require the entire table to be searched each time a load instruction was encountered to see if a corresponding store instruction existed. Another possibility is to provide a direct mapped table. However, this would require having one entry for each possible program counter value since a load instruction could appear at any program counter value. This would result in a very large data structure. The present technique therefore uses a hash of the program counter value in order to index into the table. The table could be directly mapped or could be set associative as desired.

As discussed, the prediction made by the prediction circuitry is speculative and there may be reasons why a predicted load-store forwarding operation does not complete as predicted. FIG. 3A illustrates an example in which a load-store forwarding operation works correctly, where program counter hash values are used to perform a lookup in the prediction circuitry. A first store instruction at a program counter value X takes the data stored in register x1 and stores it at the memory address stored in register x0. The hash of program counter value X is 10 in this example. A second store instruction at program counter value Y stores the data in register x3 at the address stored in register x2. The hash of program counter value Y is 12. Finally, a load instruction loads the data at the address stored in register x4 and stores that data to register x5. In this example, the address stored in register x4 and the address stored in register x0 are determined (e.g., at runtime) to be the same. The correlation is stored that the load instruction is dependent on a hashed program counter value of 10 and once sufficient confidence is established, one of the aforementioned store/load forwarding techniques can be used.

FIG. 3B shows an example in which a load-store forwarding operation is incorrectly predicted. In the illustrated example, the instructions themselves are the same as illustrated in FIG. 3A. However, this time, the hash value of program counter Y also equates to the value 10. Now, it is not clear which of the two store instructions is connected to the load instruction.

By way of a third example, FIG. 3C shows a further case where a load-store forwarding operation may be incorrectly predicted. In this example, the store instruction to which the load instruction is linked is within a loop that is executed multiple times. Consequently, the program counter value of each instance of the store instruction will be the same (and therefore the hash will also be the same). It is therefore not known which instance of the store instruction is associated with the load instruction. This is true even if hashed program counter values are not used to identify the linkage and instead only full program counter values are used.

Figure 4:
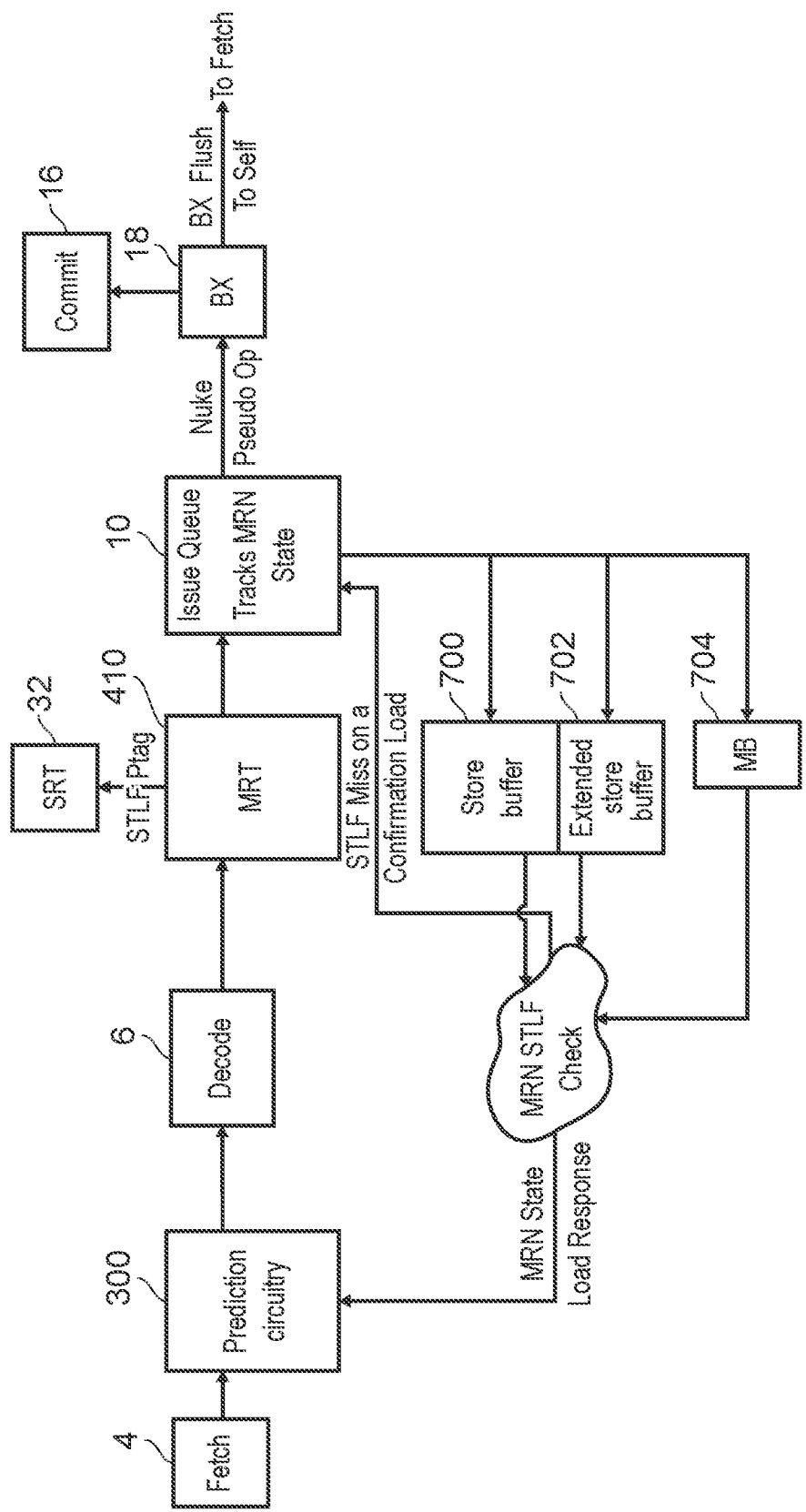
FIG. 4 schematically illustrates an apparatus according to some configurations of the present techniques.

FIG. 4 schematically illustrates details of an apparatus according to some configurations of the present techniques. The apparatus comprises a number of features that were described in relation to FIG. 1. In particular, the apparatus comprises fetch circuitry 4, prediction circuitry 300, decode circuitry 6, MRT 410, SRT 32, an issue queue 10, and a store buffer 700. The details of these circuits were described in relation to FIG. 1. The apparatus is also provided with branch prediction circuitry 18, commit circuitry 16, along with an extended store buffer 702 and merge buffer (MB) 704. The branch circuitry 18 and commit circuitry 16 are provided as part of the speculative execution provisions of the apparatus and may be utilised during the flushing of incorrectly predicted load-store forwarding operations. For example, the commit circuitry 16 may be used to store one or more completed instructions executed as part of, or subsequent to, a load-store forwarding operation to be committed once it is determined that the speculatively executed load-store forwarding operation has completed successfully.

The apparatus illustrated in FIG. 4 provides further detail of the features set out in relation to load-store forwarding operations. In particular, FIG. 4 may be used to illustrate the sequential flow that may be carried out by instructions received by the apparatus according to some configurations of the present techniques. Load instructions and store instructions fetched by the fetch circuitry 4 are identified and a lookup in the prediction circuitry 300 is performed based on the program counter of the load/store instruction. A hit in the prediction circuitry 300 indicates that the load/store instruction has been previously identified as an instruction that could participate in memory renaming. Load/store instructions that hit in the prediction circuitry 300 are marked as such, for example, a load instruction that hit in the prediction circuitry 300 would be marked as a predicted load instruction and the store instruction that hit in the prediction circuitry 300 would be marked as a predicted store instruction.

Whilst load-store forwarding could be implemented by allocating all store instructions into the MRT 410, in the illustrated configuration, the MRT 410 only tracks store instructions that have been marked as predicted store instructions indicating that those store instructions resulted in a hit in the prediction circuitry 300. Such an approach allows a smaller MRT 410 to be provided and reduces the number of physical registers that are reserved by the MRT. When a predicted load is received by the MRT 410, a lookup is performed in the MRT 410. If the lookup hits in the MRT 410, then a load-store forwarding operation is carried out, for example, as described in relation to FIG. 2. If the lookup misses in the MRT 410 then no load-store forwarding operation is carried out and the predicted load is converted to a predicted load in a store allocate state.

Stores (both predicted and non-predicted) progress through the processing pipeline and allocate to the store buffer 700. Where the stores are predicted stores, they are marked as such in the store buffer 700. When the stores complete, they may be allocated to the extended store buffer 702. The extended store buffer is provided so that load-store forwarding operations can be carried out even where there is a larger number of cycles between the store instruction and the load instruction that forwards from the store instruction. Store instructions are only allocated to the extended store buffer 702 if the allocation of the store instruction will result in the extended store buffer 702 containing at least one predicted store instruction.

When a load instruction is received by control circuitry monitoring the store buffer, that load instruction is compared against the contents of the store buffer 700 and the extended store buffer 702. Where it is determined that an entry in the store buffer 700 or the extended store buffer 702 is storing data to the memory address that the load instruction is accessing, it is determined that a load-store forwarding operation could be used in place of retrieving data from the specified location. Non-predicted load instructions for which a load-store forwarding operation could be used are allocated into the prediction circuitry 300 in a training state or may have a confidence associated with that prediction increased in the prediction circuitry 300. Alternatively, non-predicted load instructions may be converted to a predicted load instruction in a predictive state in the prediction circuitry 300, e.g., if the confidence in that prediction is already high enough. For a predicted load instruction, the apparatus is already using a load-store forwarding operation to speculatively replace the load instruction. In such cases, the determination based on the store buffer and the extended store buffer acts to confirm accuracy of the prediction. Where the determination is based on a predicted load instruction in the store-allocate state and it is determined that a load-store forwarding operation could have been used, a signal is sent to the prediction circuitry 300 to cause the store instruction indicated in the predicted load instruction to be allocated into the prediction circuitry 300.

As an additional confirmation structure, the merge buffer 704 is provided to store an unordered indication of recently retired stores that have been retired from the store buffer 700 and/or the extended store buffer 702. The merge buffer 704 does not store all details of the recently retired stores in an ordered and distinct manner (e.g., as may be done in the store buffer 700 or the extended store buffer 702) and can therefore be provided with a reduced circuit area. Entries in the merge buffer 704 are retained as a hint that a recently retired store could potentially be used in a load-store forwarding operation. A hit in the merge buffer 704 is taken as an indication that a load-store forwarding operation may have been possible. A hit for a predicted load, e.g., in a training state, in the merge buffer 704 causes the control circuitry to indicate to the prediction circuitry 300 that a confidence of the load prediction that resulted in the hit in the merge buffer 704 should neither be increased nor decreased. A predicted load in a training state may therefore receive an indication of an increased confidence where there is a hit in the store buffer 700 or the extended store buffer 702, an indication of a decreased confidence where there is a miss in the store buffer 700, the extended store buffer 702 and the merge buffer 704, and an indication that it is to remain at the same confidence where there is a miss in the store buffer 700 and the extended store buffer 702, but there is a hit in the merge buffer 704. It would be readily apparent to the skilled person that, in some alternative configurations, the merge buffer 704 could be omitted. Alternatively, the merge buffer 704 could be provided in place of the extended store buffer 702.

Figure 5:
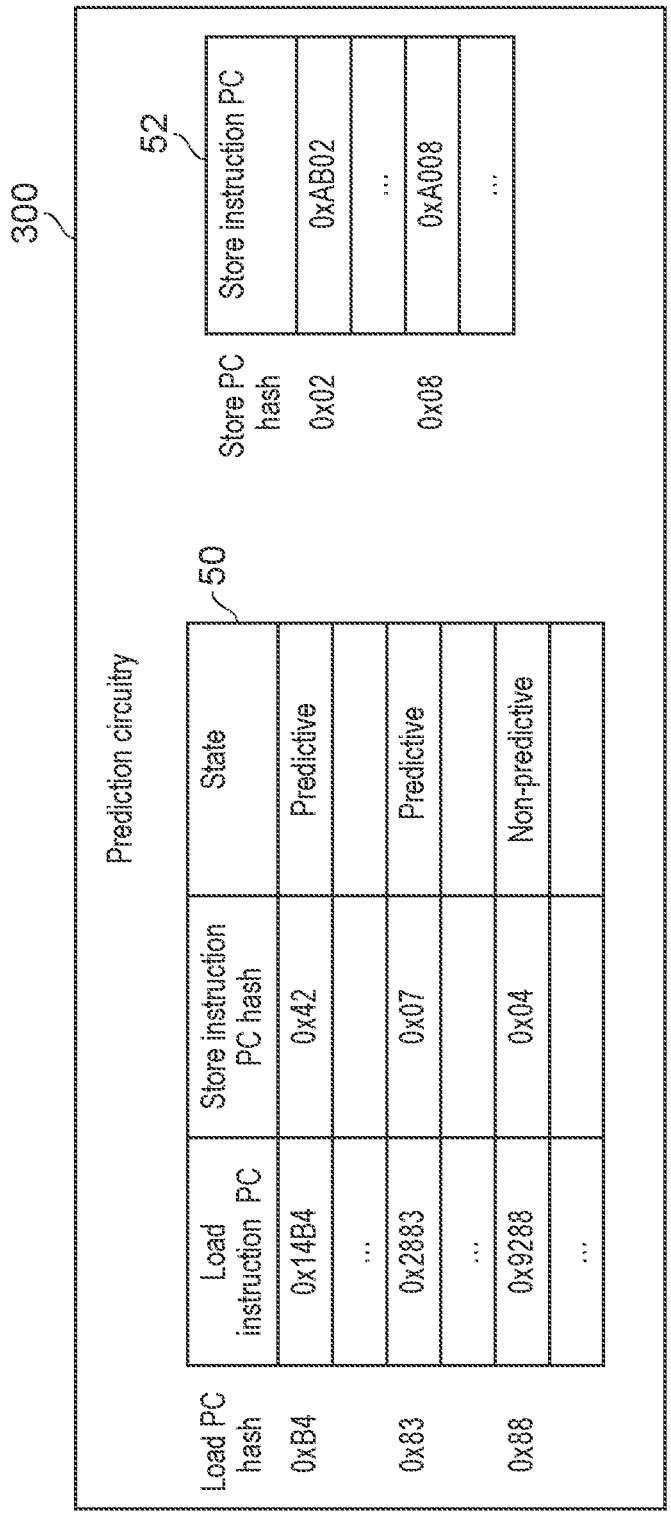
FIG. 5 schematically illustrates prediction circuitry according to some configurations of the present techniques.

FIG. 5 schematically illustrates details of the prediction circuitry 300. The prediction circuitry comprises load prediction storage circuitry 50 and store prediction storage circuitry 52. The load prediction storage circuitry 50 comprises a plurality of entries indexed by a hash of the program counter value of the load instruction indicated in the load prediction. For each load prediction stored in the load prediction storage circuitry 50, the load prediction storage circuitry 50 store the program counter value of the load instruction, a hash of the program counter value of the store instruction that is predicted to store data to the memory location that is accessed by that load instruction, and a state of the load prediction. For example, the state of the load prediction may be represented by a binary state of being predictive or non-predictive. Alternatively, the state may take multiple values indicating whether the load prediction is, e.g., invalid, in a training state (with or without an associated confidence value), or whether the load prediction is predictive.

The store prediction storage circuitry 52 store information indicative of store instructions that are predicted as taking part in a load-store forwarding operation. Store predictions in the store prediction storage circuitry 52 are identified using a hash of the program counter value of the store instruction and comprise information indicating the program counter value of the store instruction. A store instruction having a given program counter value can therefore be looked up in the store prediction storage circuitry 52 based on a hash of the given program counter value. When the hash of the program counter value hits in the store prediction storage circuitry 52, the full program counter can be checked to determine if the store instruction is a predicted store instruction.

It would be readily apparent to the skilled person that the load prediction storage circuitry 50 and the store prediction storage circuitry 52, whilst illustrated as separate storage structures, could be provided as a single storage structure with the data stored at entries in that single storage structure interpreted based on a type of the instruction (e.g., load or store) for which the lookup was performed. Furthermore, the load prediction storage circuitry 50, the store prediction storage circuitry 52 and/or a single storage structure could be provided as a set associative storage structure having an associativity greater than 1.

Figure 6:
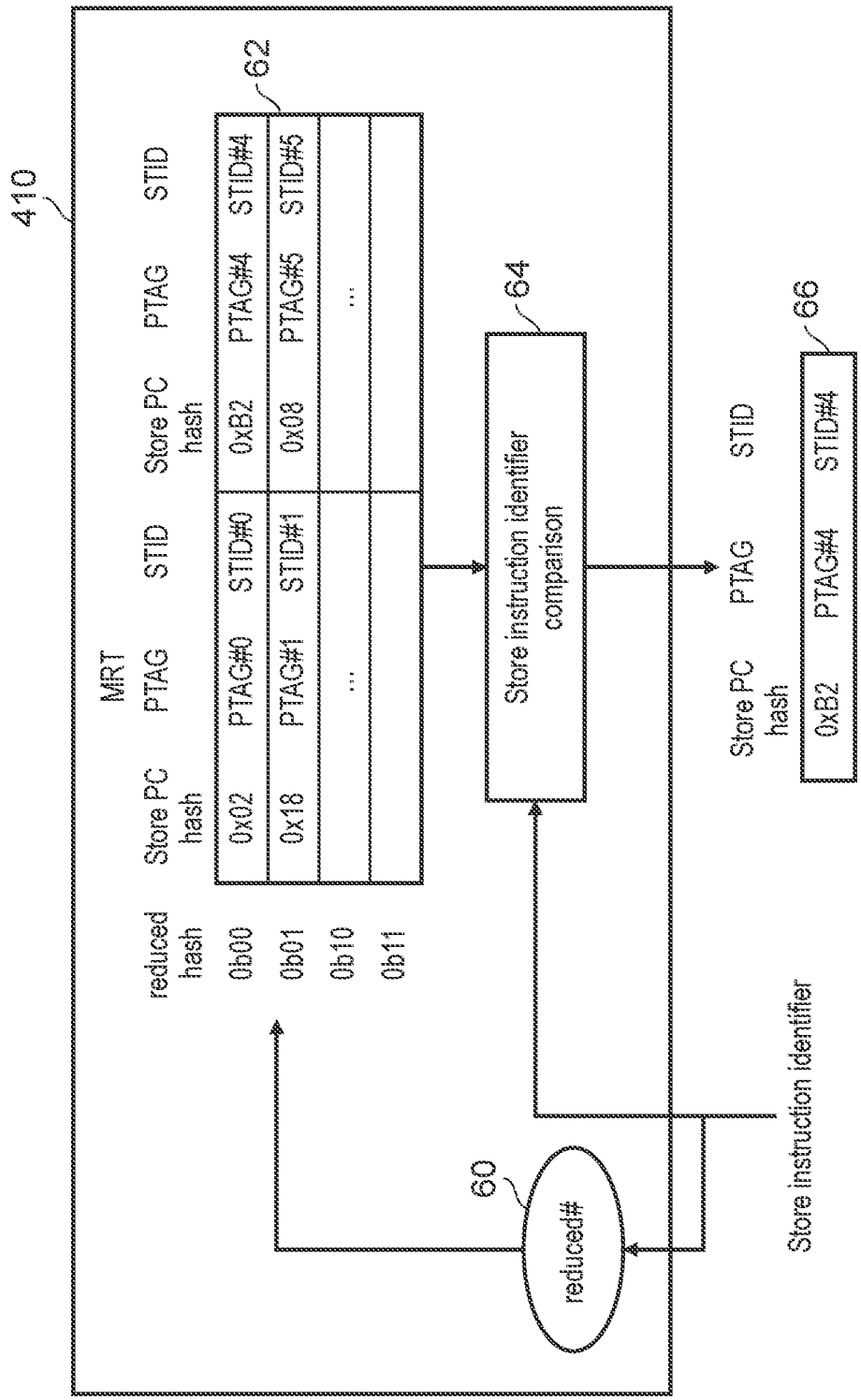
FIG. 6 schematically illustrates a memory rename table according to some configurations of the present techniques.

FIG. 6 schematically illustrates details of the MRT 410 according to some configurations of the present techniques. The MRT 410 includes a storage table 62, which in the illustrated configuration is a set associative storage table having associativity of two. The MRT 410 also includes hash circuitry 60 and store instruction identifier comparison circuitry 64. Each entry in the storage table 62 is identified based on a reduced hash of the prediction identifier generated using hash circuitry 60 from a received store identifier. The entries of the storage table 62 comprise a hash of the program counter value of the store instruction indicated in that entry, a PTAG identifier to identify a physical register that the data indicated in the store instruction is to be taken from, and a store identifier (STID) assigned earlier in the pipeline to identify the store instruction. On receipt of a store instruction (either a predicted store instruction or a non-predicted store instruction), a lookup is performed in the storage table 62 based on the reduced hash of the store instruction identifier. The set identified by the reduced hah of the store instruction identifier is read out to the store instruction identifier comparison circuitry 64 which compares the store instruction identifier to the store instruction identifier (the store PC hash) stored in the storage table 62. In the event of a hit, the entry identified by the store instruction identifier comparison circuitry 64 is invalidated. When the store instruction is a predicted store instruction, a new entry is allocated to identify that store instruction in the MRT 410. The PTAG identifying the physical register that the data indicated in the store instruction is to be taken from and the STID are stored in the entry. In this way, the MRT 410 always identifies the youngest store having a given store instruction identifier. As a result, if two store instructions alias to the same store instruction identifier (e.g., the same PC hash), then only the youngest of those store instructions will be recorded in the MRT.

When a load instruction indicated as a predicted load is received by the MRT 410, a lookup in the storage table 62 is performed based on the store instruction identifier indicated in the predicted load instruction (i.e., the store instruction identifier retrieved from the prediction circuitry 300). A hit on an entry 66 in the storage table 62 based on the store prediction identifier will cause the entry 66 to be read out and the destination register for the load instruction can be mapped to the PTAG stored in the entry 66.

FIG. 7 schematically illustrates an operation of the control circuitry 40 with respect to a store buffer 700 that is used in checking/training. In particular, the control circuitry 40 can be used to set up and maintain entries in the MRT 410 and prediction circuitry 300 by using the store buffer 700. The store buffer 700 is a buffer of store operations, which is kept prior to the store operations being sent out to the memory hierarchy.

As previously described, a load instruction LDR that is a predicted load is still at least partially performed, even if a load-store forwarding operation is possible (meaning that the data retrieved by the load instruction LDR is not necessarily required). The load instruction is followed by the check described below to ensure that the data passed as part of the store/load forwarding matches what was actually fetched by the load instruction LDR.

Once the load instruction is executed, this process searches the store buffer 700 to search recently performed stores belonging to the hashed store program counter value. Each entry of the store buffer contains a UID, which is a (micro-) operation identifier. The UIDs are allocated to (micro-) operations, which are generated by the decode circuitry. They therefore represent the age of a (micro-) operation (or instruction) in program order with smaller values representing older (micro-) operations. Each entry also contains a virtual address at which the store is to take place, a program counter value of the instruction corresponding with the (micro-) operation, a hash of the program counter value so that this need not be repeatedly recalculated, and an indication of whether the store instruction is a predicted store. In the illustrated configuration, the predicted store value takes a value of logical 1 to indicate that the store is a predicted store and a 0 to indicate that the store is not a predicted store. A value of "X" indicates that the value could be either 0 (e.g., in some examples as will be discussed below) or a 1 (e.g., in other examples as will be discussed below).

When a load instruction is received by the control circuitry, a lookup is performed in the store buffer. The lookup is performed for all load instructions regardless as to whether those load instructions are predicted loads, loads in the store-allocate state, or load instructions in another state. For a load instruction that is a predicted load, the lookup is a confirmatory lookup to confirm whether the load-store forwarding operation has been correctly predicted. For a load instruction in the store-allocate state, the lookup is to determine whether there is a store instruction in the store buffer that stores data to the memory address from which the load instruction is going to load the data, e.g., is there a store instruction that can participate in a load-store forwarding operation with that load instruction. When the load instruction is in another state, the lookup may be performed to determine whether that load instruction could participate in a load-store forwarding instruction, e.g., whether it should be entered into the prediction circuitry in a training state or whether a confidence of an existing training entry in the prediction state should be increased.

In any case, the form of the lookup in the store buffer is the same and will be described in the context of a predicted load. When a predicted load is received, e.g., one for which a load-store forwarding operation is being speculatively carried out, the hashed store PC value corresponding to the load is obtained (e.g. from the MRT 410) together with the STID, which is also a (micro-) operation identifier for that store instruction.

The store buffer is then searched. The aim of the search is to identify an entry in the store buffer that stores data to the same address from which the load instruction is going to load the data. In the event of a hit, the entry of the store buffer is checked to confirm whether there are any younger stores (STID younger than the entry that resulted in the hit) in the store buffer that are older than the load instruction (having a STID that is older than the UID of the load) and have the same program counter value as the entry that hit. If there are no younger stores, then load-store forwarding can be successfully carried out. If the load is a predicted load, then the speculative load-store forwarding operation, that may already have been executed, is allowed to continue.

If there is an entry having the same hashed store PC value with a UID that is younger that the STID and older than the load's UID then the requirements for a load-store forwarding operation fail and if the load is a predicted load, a flush may need to be triggered to flush the speculatively executed load-store forwarding operation from the pipeline. The predicted load may also be invalidated or the load prediction may be set to a training state with the confidence for this load prediction decremented.

For example, a predicted load operation with a UID of 32 is assessed. It accesses a virtual address (VA) 0x1100. The STID mentioned in the MRT 410 for this load is 22 and a load-store forwarding operation has occurred/will therefore occur from an instruction having a (micro-) operation with this UID. Looking at the entry in the store buffer 700 to find stores that access virtual address 0x1100, it can be seen that the store with UID 22 stores to this virtual address, which correlates with the entry in the MRT 410. The hash (PC) associated with UID=22 is 21 (this can also be deduced from the index of the MRT 410). Looking again at the store buffer, it can be seen that the requirements for a load-store forwarding operation are not met. In particular, there is a younger (newer) entry having UID=31 in the store buffer (having a UID greater than UID=22) that is older than the load (UID=32) that has a program counter value hash of 21. The load-store forwarding operation that is being executed speculatively has therefore been incorrectly predicted due to a hash conflict and so a flush must occur for instructions following the load instruction. Furthermore, a confidence value for this store/load pairing is decremented.

As another example, a predicted load operation with a UID of 35 is assessed. It accesses a virtual address 0x1200. The STID mentioned in the MRT 410 for this load is 28 and a load-store forwarding has occurred/will therefore occur from a store instruction having a (micro-) operation with this UID. Searching the store buffer 700 for an entry storing data to the virtual address 0x1200, it can be seen that the hash (PC) associated with UID=28 is 32 (again, this could be deduced from the MRT 410). Looking at the store buffer, we see that the requirements for load-store forwarding are met. In particular, each entry in the store buffer that is greater than 32 (e.g., younger than the UID of the store instruction that resulted in the hit) and less than 35 (e.g., older than the load instruction) has a different hash (PC). Indeed, there is only one such entry having a UID of 33. The hash (PC) value of the store having a UID of 33 is 10, which clearly differs from 32. The load-store forwarding operation can therefore continue as predicted. Alternatively, if the load instruction was in a training state then confidence for this store/load pairing is therefore incremented. Otherwise, if the load instruction was in a store-allocate state then the control circuitry would trigger allocation of the store instruction corresponding to the UID of 28 in the prediction circuitry.

As discussed, the store buffer 700 can also be used to determine an initial pairing. For example, if the UID and the virtual address accessed by a load operation are known, then the store buffer can be searched for an entry younger than the UID of the store instruction that accesses the same virtual address.

Figure 8:
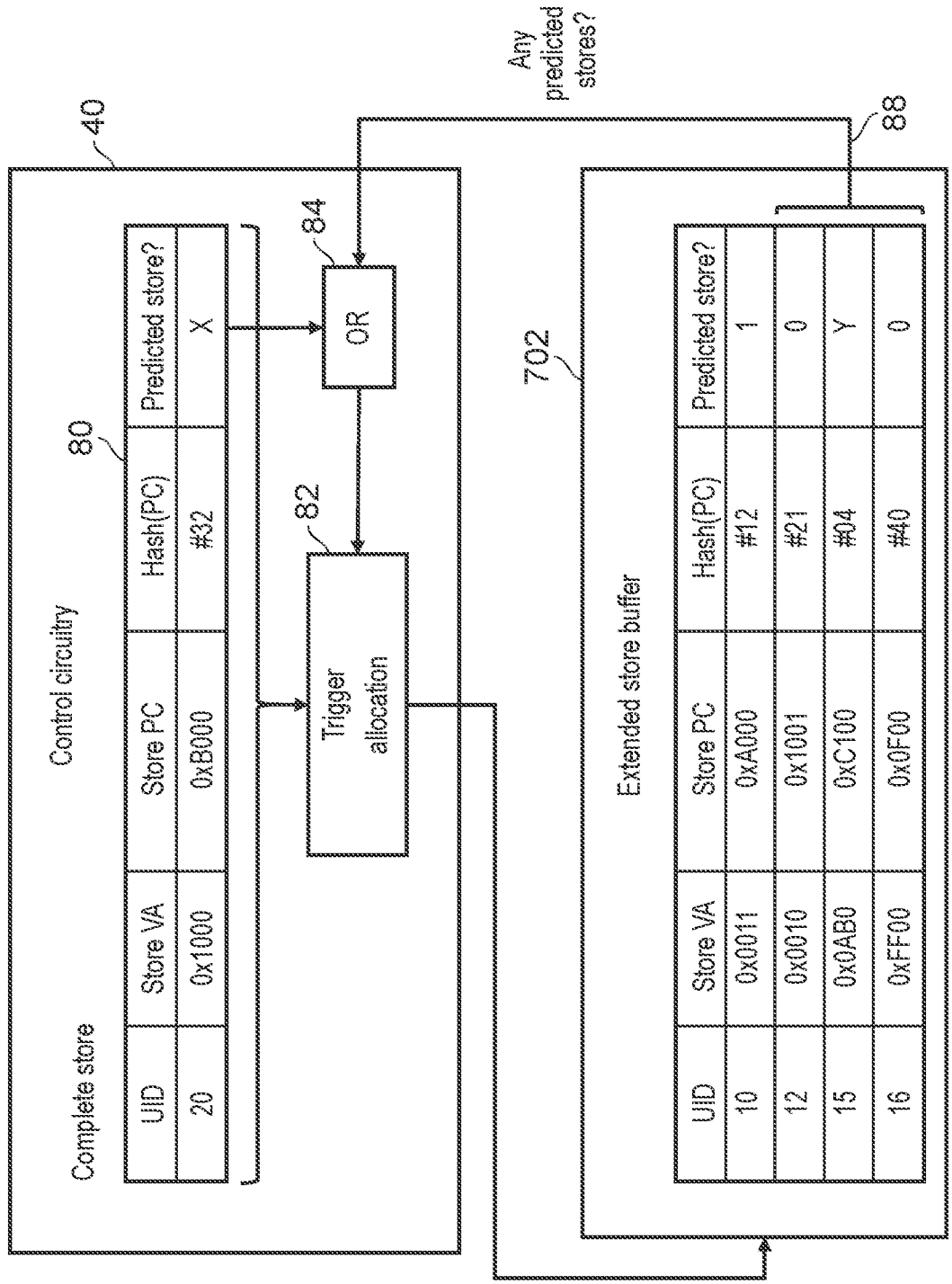
FIG. 8 schematically illustrates control circuitry according to some configurations of the present techniques.

FIG. 8 schematically illustrates the operation of control circuitry 40 according to some configurations of the present techniques. The control circuitry 40 receives indication of a completed store 80. The completed store has a UID of 20, stores to a virtual address of 0x1000, has a store PC value of 0xB000, and a hash (PC) value of 32. In the illustrated configuration, the predicted store indication takes a value of X and cases of X=0 (the store is not a predicted store) and X=1 (the store is a predicted store) will be discussed below. The control circuitry has allocation circuitry 82 and OR logic 84. The apparatus is also provided with an extended store buffer 702. The store buffer stores a plurality of stores that have been allocated to the extended store buffer 702 subsequent to completion. In the illustrated configuration, the extended store buffer comprises four entries. Of the four entries, one is marked as a predicted store, two are marked as not being predicted stores and one is marked as having a value of Y. Cases Y=0 (the store is not a predicted store) and Y=1 (the store is a predicted store).

The extended store buffer is provided as an extension to the store buffer to retain details of store operations once those store operations are completed to enable load-store forwarding operations to be assessed for cases in which the number of cycles between the store instruction and the load instruction is too great for the store instruction to remain in the store buffer once the load instruction is executed. A completed store is allocated into the extended store buffer when the control circuitry determines that allocation of that completed store will result in at least one completed store being present in the extended store buffer subsequent to that allocation. In the illustrated example, the oldest entry in the extended store buffer has UID 10 and is a predicted store. Allocation of a younger completed store to the extended store buffer will cause eviction of this oldest completed store. As a result, the allocation is independent of whether this completed store is a predicted store or not. Rather, the allocation is determined based on a logical OR of whether the predicted store is a completed store and whether any of the set of completed stores 88, comprising all completed stores in the extended store buffer except the oldest completed store in the extended store buffer. When the result of the logical OR is a one, then the allocation circuitry 82 triggers allocation of the completed store 80 in the extended store buffer 702. Otherwise, when the result of the logical OR is a zero then the allocation circuitry 82 does not trigger allocation of an entry in the extended store buffer 702.

For the case where the completed entry is a predicted store (X=1) and the set of entries does not contain any predicted stores (Y=0), then the completed store 80 is allocated into the extended store buffer 702. For the case where the completed entry is a predicted store (X=1) and the set of entries does contain a predicted store (Y=1), then the completed store 80 is allocated into the extended store buffer 702. For the case where the completed entry is not a predicted store (X=0) and the set of entries does not contain any predicted stores (Y=0), then the completed store 80 is not allocated into the extended store buffer 702. For the case where the completed entry is not a predicted store (X=0) and the set of entries does contain a predicted store (Y=1), then the completed store 80 is allocated into the extended store buffer 702.

The extended store buffer can then be searched in combination with the store buffer in response to receipt of a load instruction as described in relation to FIG. 7 above. It would be readily apparent to the skilled person that, in alternative configurations, the extended store buffer may contain a greater or smaller number of entries than the four illustrated in FIG. 8.

Figure 9:
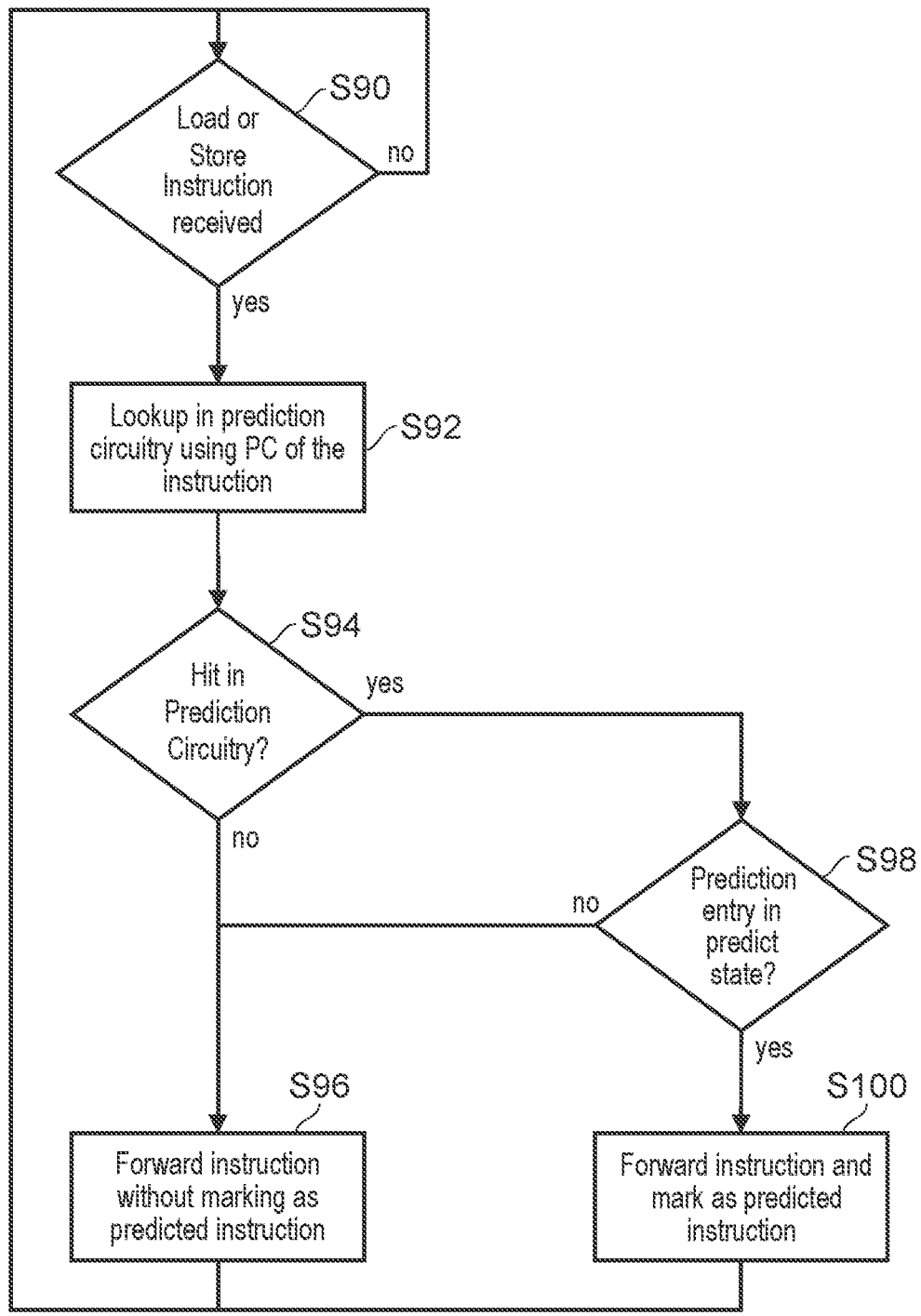
FIG. 9 schematically illustrates a sequence of steps carried out according to some configurations of the present techniques.

FIG. 9 schematically illustrates a sequence of steps carried out at prediction circuitry in some configurations of the present techniques. Flow begins at step S90 where it is determined if a load instruction or a store instruction is received. If, at step S90, it is determined that neither a load instruction nor a store instruction has been received, then flow remains at step S90. If, at step S90, it is determined that a load instruction or a store instruction has been received, then flow proceeds to step S92 where a lookup in the prediction circuitry is performed based on a program counter of the instruction, e.g., using a hash of the program counter value. Flow then proceeds to step S94 where it is determined if the lookup hit in the prediction circuitry. If, at step S94, it was determined that the lookup hit in the prediction circuitry, then flow proceeds to step S98. If, at step S94, it was determined that the lookup did not hit in the prediction circuitry, then flow proceeds to step S96. At step S98, it is determined if the prediction entry is in the predict state. If, at step S98, it is determined that the prediction entry is not in the prediction state, then flow proceeds to step S96. If, at step S98, it was determined that the prediction entry was in the predict state, then flow proceeds to step S100. At step S96, the load instruction or the store instruction is forwarded without marking that instruction as a predicted instruction before flow returns to step S90. At step S100, the load instruction or the store instruction is marked as a predicted instruction and forwarded before flow returns to step S90.

Figure 10:
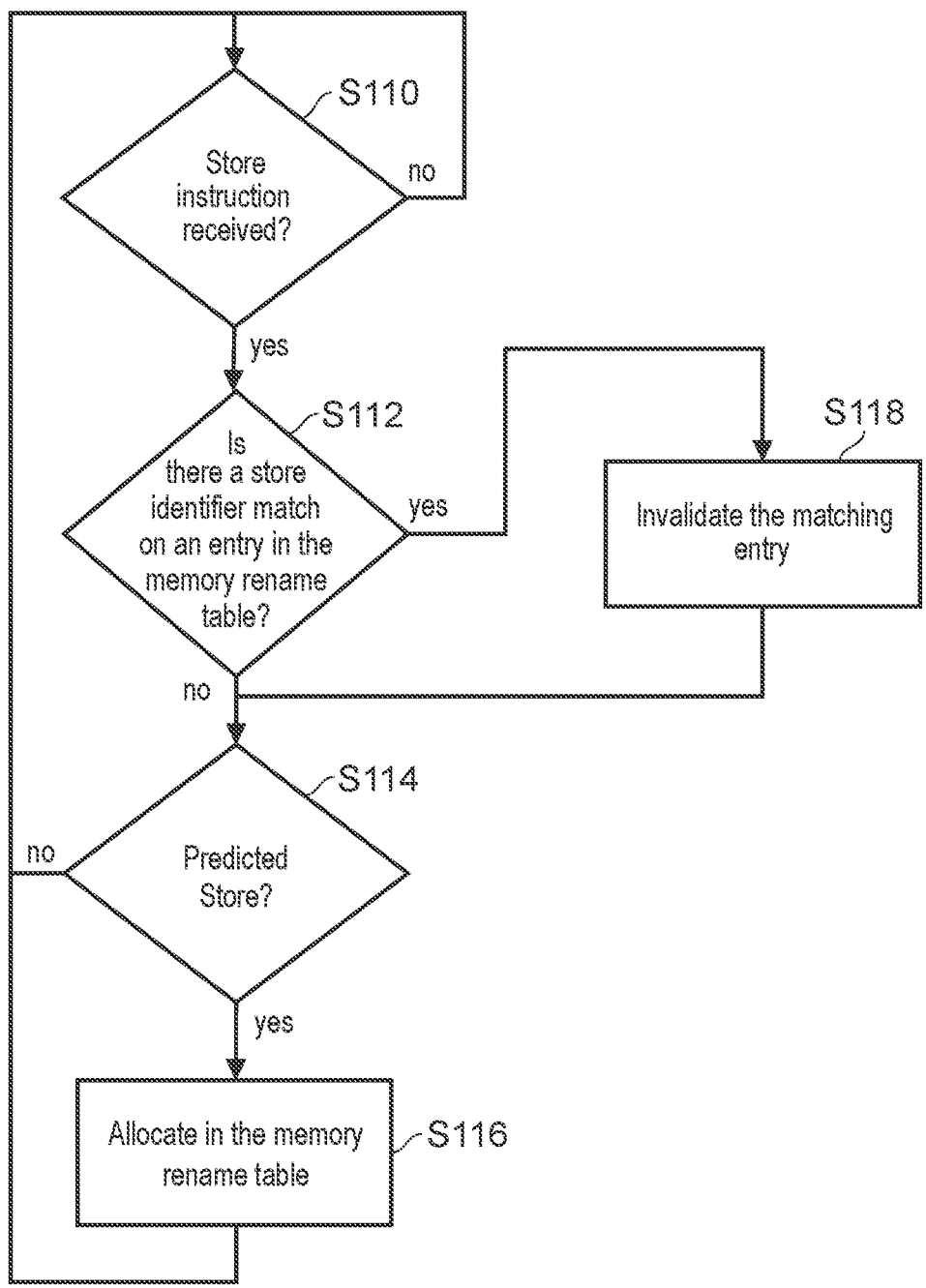
FIG. 10 schematically illustrates a sequence of steps carried out according to some configurations of the present techniques.

FIG. 10 schematically illustrates a sequence of steps carried out by rename circuitry according to some configurations of the present techniques. Flow begins at step S110 where it is determined if a store instruction is received. If, at step S110, it is determined that no store instruction has been received, then flow remains at step S110. If, at step S110, it is determined that a store instruction was received, then flow proceeds to step S112. At step S112, it is determined if there is a store identifier match on an entry in the memory rename table. If, at step S112, it is determined that there is not a match on an entry in the rename table, then flow proceeds to step S114. If, at step S112, it is determined that there is a match on an entry in the rename table, then flow proceeds to step S118 where the matching entry is invalidated before flow proceeds to step S114. At step S114, it is determined whether the store is a predicted store. If, at step S114, it is determined that the store is not a predicted store, then flow returns to step S110. If, at step S114, it is determined that the store is a predicted store, then flow proceeds to step S116 where the predicted store is allocated in the rename table before flow returns to step S110.

Figure 11:
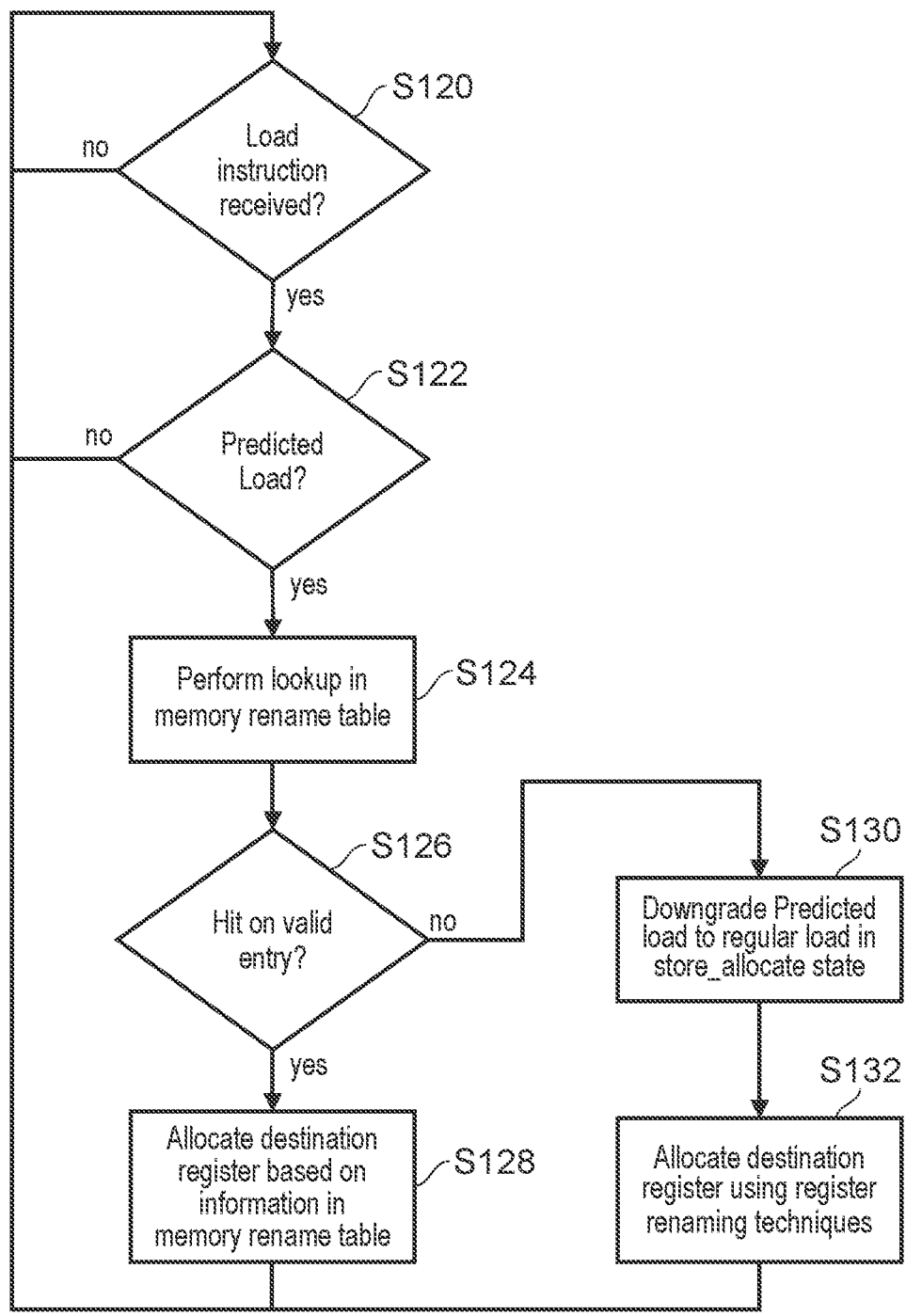
FIG. 11 schematically illustrates a sequence of steps carried out according to some configurations of the present techniques.

FIG. 11 schematically illustrates a sequence of steps carried out by rename circuitry according to some configurations of the present techniques. Flow begins at step S120 where it is determined if a load instruction is received. If, at step S120, it is determined that a load instruction has not been received, then flow remains at step S120. If, at step S120, it is determined that a load instruction has been received, then flow proceeds to step S122. At step S122, it is determined if the load instruction is a predicted load instruction. If, at step S122, it is determined that the load instruction is not a predicted load instruction, then flow returns to step S120. If, at step S122, it is determined that the load instruction is a predicted load instruction, then flow proceeds to step S124. At step S124 a lookup is performed in the memory rename table. Flow then proceeds to step S126 where it is determined if the lookup in the memory rename table resulted in a hit. If, at step S126, it is determined that the lookup in the memory rename table resulted in a hit, then flow proceeds to step S128 where the destination register indicated in the load instruction is allocated based on the information in the memory rename table before flow returns to step S120. If, at step S126, it is determined that the lookup in the memory rename table missed (did not hit), then flow proceeds to step S130, where the predicted load is downgraded to a regular load in the store allocate state. Flow then proceeds to step S132, where the destination register in the load instruction is allocated using standard register renaming techniques. Flow then returns to step S120.

Figure 12:
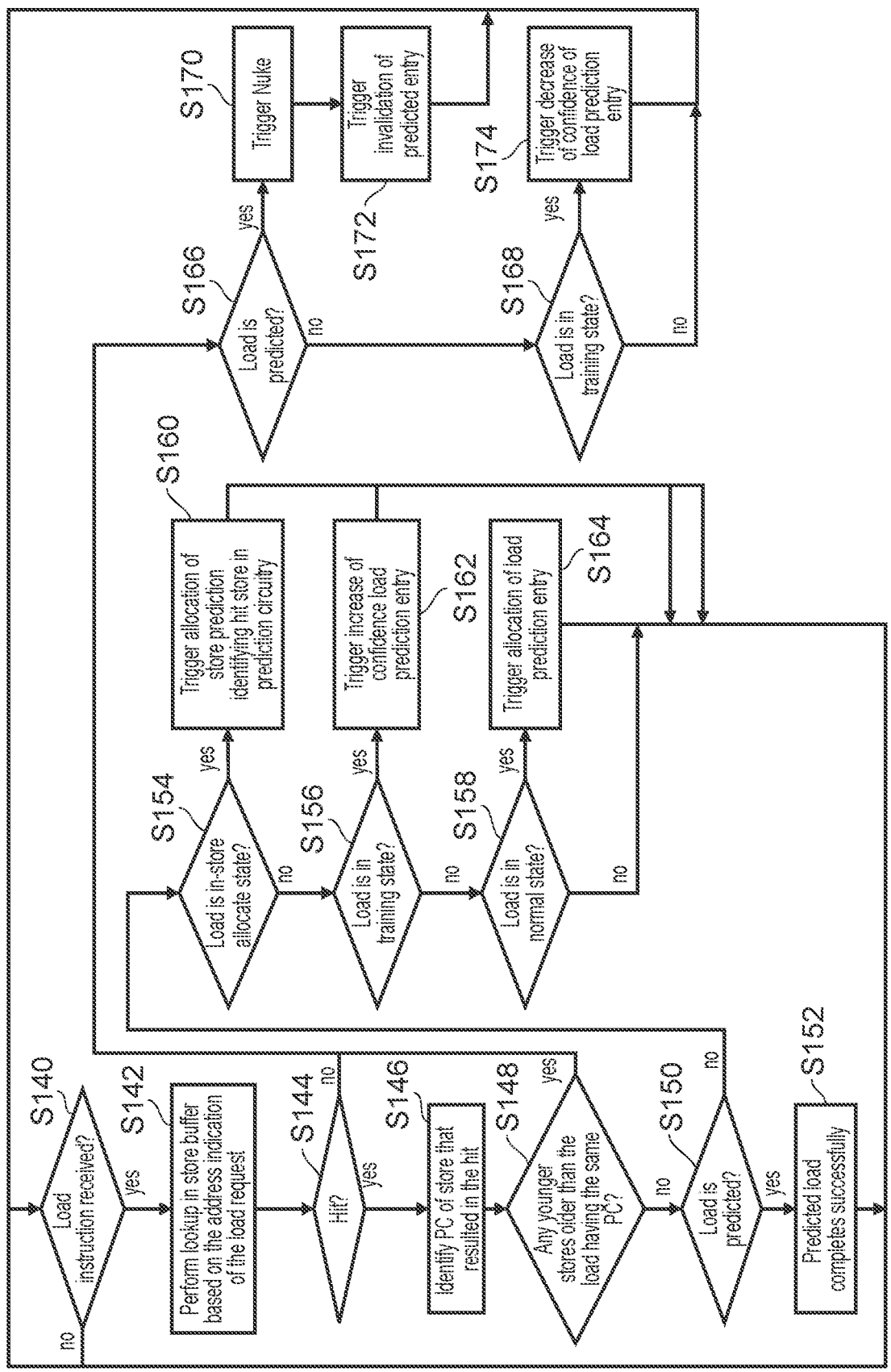
FIG. 12 schematically illustrates a sequence of steps carried out according to some configurations of the present techniques.

FIG. 12 schematically illustrates a sequence of steps carried out by control circuitry in some configurations of the present techniques. Flow begins at step S140, where it is determined if a load instruction has been received by the control circuitry. If, at step S140, no load instruction has been received, then flow remains at step S140. If, at step S140, it is determined that a load instruction has been received by the control circuitry, then flow proceeds to step S142 where the control circuitry causes a lookup to be performed in the store buffer (including the extended store buffer for configurations in which the extended store buffer is present) based on the address indication in the load request, the address indication indicating an address from which the load instruction will load the data. The address indication may be a virtual address indication or a physical address indication dependent on the address space usage of the configuration.

Flow then proceeds to step S144, where it is determined if the lookup resulted in a hit in the store buffer. If, at step S144, it is determined that the lookup did not hit (e.g., the lookup missed) in the store buffer, then flow proceeds to step S166 (which will be described below). If, at step S144, it is determined that the lookup resulted in a hit in the store buffer, then flow proceeds to step S146 where the program counter of the store that resulted in the hit is identified. Flow then proceeds to step S148 where it is determined if there are any younger stores (i.e., stores that are younger than the store that resulted in the hit) present in the store buffer that are older than the load instruction and that have the same program counter value. If at step S148, it is determined that there are younger stores that are older than the load instruction and that have the same program counter value, then flow proceeds to step S166. If, at step S148, it was determined that there are not any younger stores that are older than the load instruction and that have the same program counter value, then flow proceeds to step S150. At step S150, it is determined if the load is a predicted load. If, at step S150, it is determined that the load is a predicted load, then flow proceeds to step S152 where the predicted load is allowed to complete successfully before flow returns to step S140.

If, at step S150, it was determined that the load is not a predicted load, then flow proceeds to step S154. At step S154, it is determined if the load is in the store-allocate state. If, at step S154, it is determined that the load is in the store allocate state, then flow proceeds to step S160 where the control circuitry triggers allocation of a store prediction identifying the store that hit during the lookup (i.e., the lookup performed in step S142) in the prediction circuitry before flow returns to step S140. If, at step S154, it was determined that the load is not in a store-allocate state, then flow proceeds to step S156. At step S156, it is determined if the load is in a training state (i.e., if there is a load prediction associated with that load instruction in the prediction circuitry and that load prediction is in the training state). If, at step S156, it is determined that the load is in the training state, then flow proceeds to step S162 where the control circuitry triggers an increase in the confidence of the load prediction corresponding to that load instruction before flow returns to step S140. If, at step S156, it was determined that the load was not in the training state, then flow proceeds to step S158. At step S158, it is determined if the load instruction is in a normal state, i.e., it is a load instruction that is not in the load training state or in the store-allocate state. If, at step S158, it is determined that the load instruction is in a normal state, then flow proceeds to step S164 where the control circuitry triggers allocation of a load prediction identifying the load instruction in the prediction circuitry before flow returns to step S140. If, at step S158, it was determined that the load instruction is not in the normal state, then flow returns to step S140.

At step S166 it is determined if the load is a predicted load (recall that this is a load instruction for which either the lookup in the prediction circuitry resulted in a miss, or the lookup result in a hit but that there were younger store instructions older than the load instruction that have the same program counter value also present in the store buffer). If, at step S166, it is determined that the load is a predicted load, then flow proceeds to step S170 where a nuke (a flush of the load-store forwarding operation and any younger instructions dependent on the load-store forwarding operation) of the load-store forwarding operation is triggered (i.e., it is determined that the speculatively executed load-store forwarding operation was incorrectly predicted and a replay is required) before flow proceeds to step S172 where invalidation of the load prediction associated with the load instruction is triggered. Flow then returns to step S140. If, at step S166, it was determined that the load is not a predicted load, then flow proceeds to step S168 where it is determined if the load is in a training state. If, at step S168, it is determined that the load is in a training state, then flow proceeds to step S174, where the control circuitry triggers a decrease in the confidence of the load prediction in the prediction circuitry before flow returns to step S140. If, at step S168, it was determined that the load is not in the training state, then flow returns to step S140.

Figure 13:
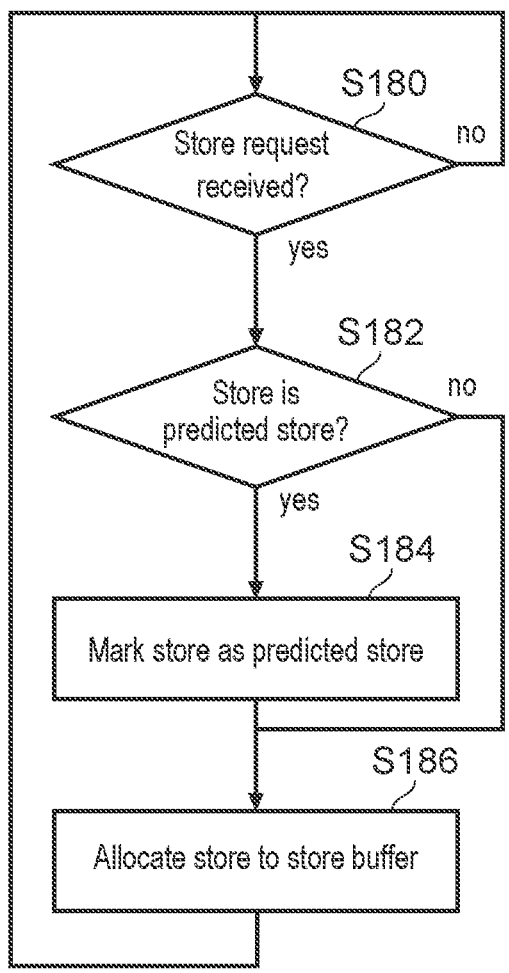
FIG. 13 schematically illustrates a sequence of steps carried out according to some configurations of the present techniques.

FIG. 13 schematically illustrates a sequence of steps carried out by the control circuitry according to some configurations of the present techniques. Flow begins at step S180 where it is determined if a store request has been received. If, at step S180, it is determined that a store request has not been received, then flow remains at step S180. If, at step S180, it is determined that a store request has been received, then flow proceeds to step S182. At step S182, it is determined if the store is a predicted store. If, at step S182, it is determined that the store is not a predicted store, then flow proceeds to step S186. If, at step S182, it was determined that the store is a predicted store, then flow proceeds to step S184 where the store is marked as a predicted store before flow proceeds to step S186. At step S186, the store (either marked as a predicted store or not dependent on whether that store was predicted) is allocated to the store buffer. Flow then returns to step S180.

Figure 14:
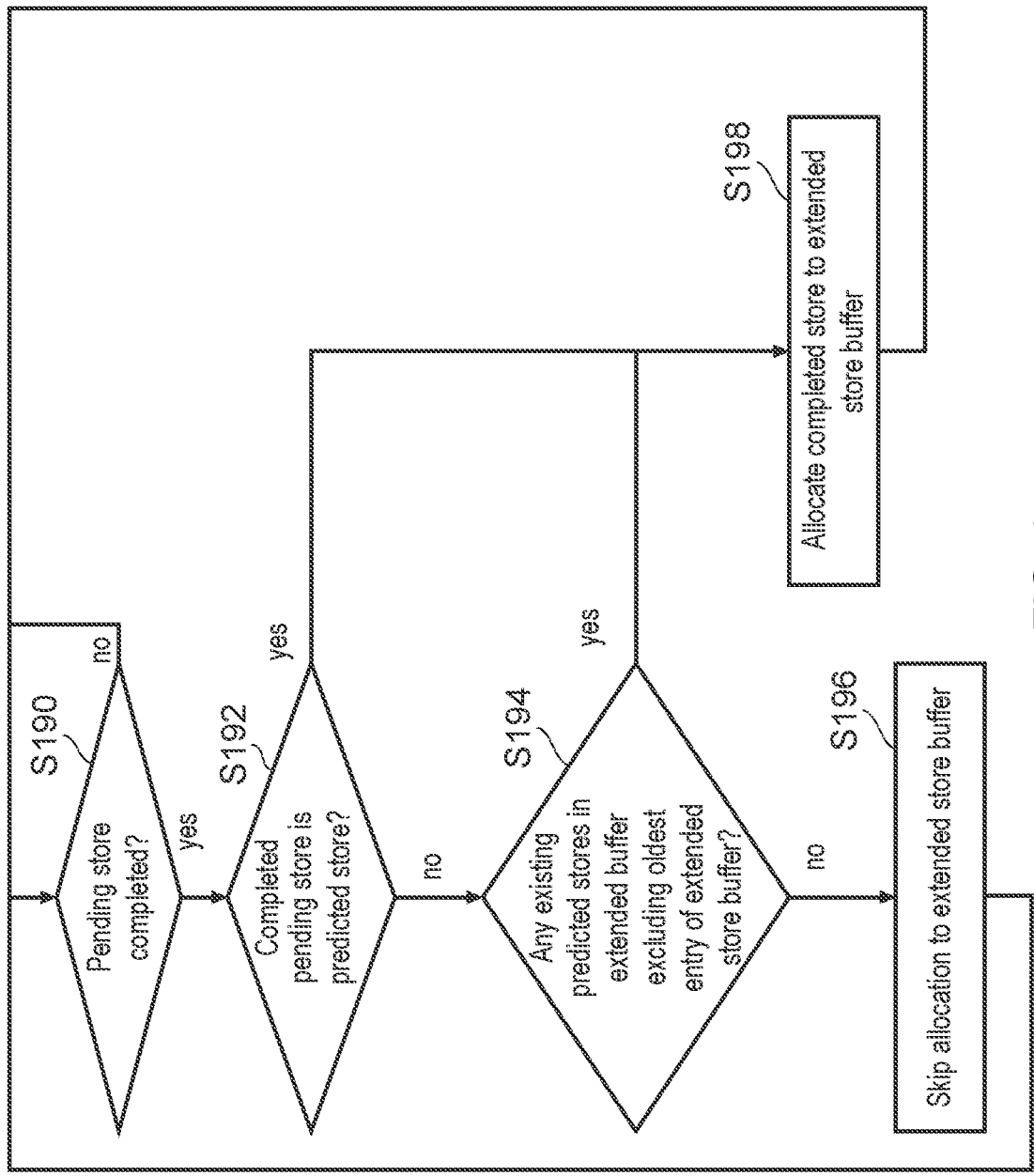
FIG. 14 schematically illustrates a sequence of steps carried out according to some configurations of the present techniques.

FIG. 14 schematically illustrates a sequence of steps carried out by control circuitry according to some configurations of the present techniques. Flow begins at step S190 where it is determined if a pending store, e.g., as stored in the store buffer, has completed. If, at step S190, it is determined that no pending store has completed, then flow remains at step S190. If, at step S190, it is determined that a pending store has completed, then flow proceeds to step S192 where it is determined if the completed store is a predicted store (e.g., the store instruction has been marked as a predicted store in the store buffer). If, at step S192, it is determined that the completed store is a predicted store, then flow proceeds to step S198. If, at step S192, it is determined that the completed store is not a predicted store, then flow proceeds to step S194. At step S194, it is determined if there are any existing predicted stores in the extended store buffer, excluding the oldest entry of the extended store buffer (i.e., the entry that will be evicted in the event that a new entry is allocated into the extended store buffer). If, at step S194, it is determined that there are existing predicted stores in the extended store buffer excluding the oldest entry of the extended store buffer, then flow proceeds to step S198 where the completed store is allocated to the extended store buffer before flow returns to step S190. If, at step S196, it was determined that there were no existing predicted stores in the extended store buffer excluding the oldest entry of the extended store buffer, then flow proceeds to step S196 where allocation of the store into the extended store buffer is skipped (omitted) before flow returns to step S190.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 15:
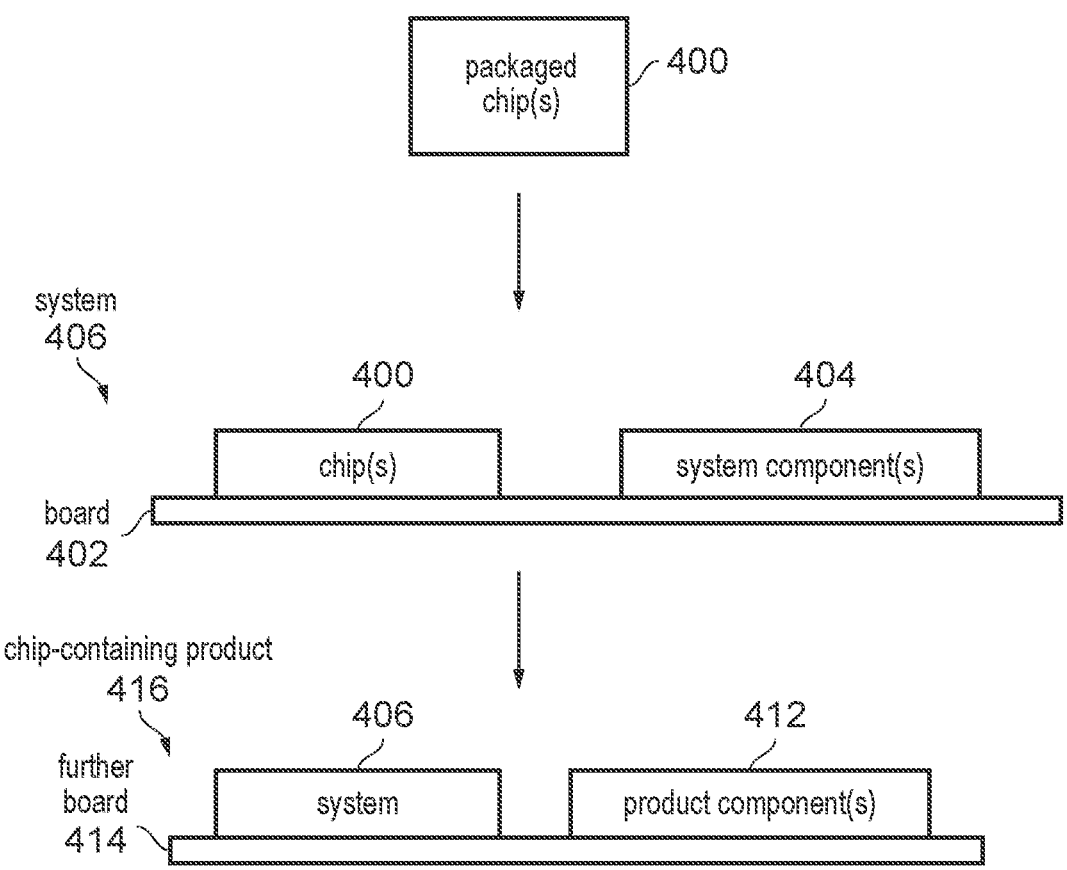
FIG. 15 schematically illustrates a packaged chip and a system according to some configurations of the present techniques.

As shown in FIG. 15, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Concepts described herein may be embodied in an apparatus comprising execution circuitry having one or more vector processing units for performing vector operations on vectors comprising multiple data elements. Execution circuitry having X vector processing units each configured to perform vector operations on Y bit wide vectors, with the respective vector processing units operable in parallel, may be said to have an XxY bit vector datapath. In some embodiments, the execution circuitry is provided having six or more vector processing units. In some embodiments, the execution circuitry is provided having five or fewer vector processing units. In some embodiments, the execution circuitry is provided having two vector processing units (and no more). In some embodiments, the one or more vector processing units are configured to perform vector operations on 128-bit wide vectors. In some embodiments, the execution circuitry has a 2x128 bit vector datapath. Alternatively, in some embodiments the execution circuitry has a 6x128 bit vector datapath.

Concepts described herein may be embodied in an apparatus comprising a level one data (L1D) cache. The L1D cache is a private cache associated with a given processing element (e.g. a central processing unit (CPU) or graphics processing element (GPU)). In a cache hierarchy of multiple caches capable of caching data accessible by load/store operations processed by the given processing element, the L1D cache is a level of cache in the hierarchy which is faster to access than a level two (L2) cache. In some embodiments, the L1 data cache is the fastest to access is the hierarchy, although even faster to access caches, for example, level zero (L0) caches may also be provided. If a load/store operation hits in the L1D cache, it can be serviced with lower latency than if it misses in the L1D cache and is serviced based on data in a subsequent level of cache or in memory. In some embodiments, the L1D cache comprises storage capacity of less than 96 KB, in one example the L1D cache is a 64 KB cache. In some embodiments, the L1D cache comprises storage capacity of greater than or equal to 96 KB, in one example the L1D cache is a 128 KB cache.

Concepts described herein may be embodied in an apparatus comprising a level two (L2) cache. The L2 cache for a given processing element is a level of cache in the cache hierarchy that, among caches capable of holding data accessible to load/store operations, is next fastest to access after the L1D cache. The L2 cache can be looked up in response to a load/store operation missing in the L1D cache or an instruction fetch missing in an L1 instruction cache. In some embodiments, the L2 cache comprises storage capacity of less than 1536 KB (1.5 MB), in one example the L2 cache is a 1024 KB (1 MB) cache. In some embodiments, the L2 cache comprises storage capacity greater than or equal to 1536 KB and less than 2560 KB (2.5 MB), in one example the L2 cache is a 2048 KB (2 MB) cache. In some embodiments, the L2 cache comprises storage capacity greater than or equal to 2560 KB, in one example the L2 cache is a 3072 KB (3 MB) cache. In some embodiments, the L2 cache has a larger storage capacity than the L1D cache.

Figure 16:
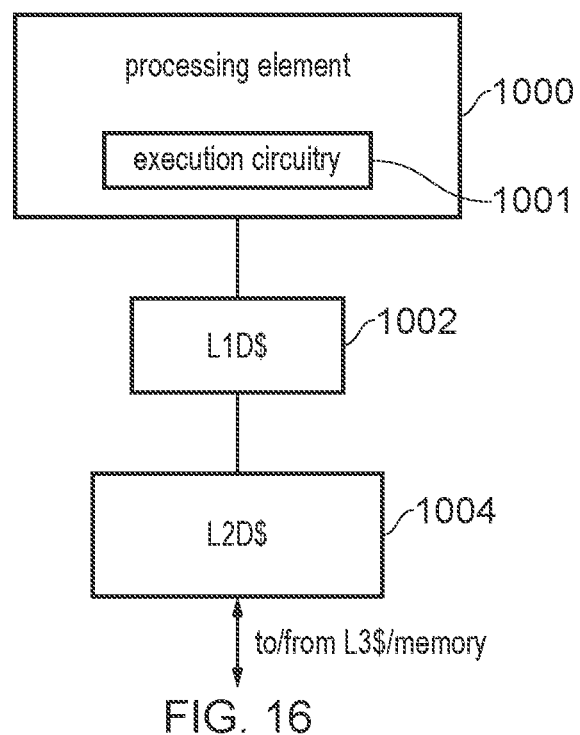
FIG. 16 schematically illustrates a processing element according to some configurations of the present techniques.

FIG. 16 illustrates an example of an apparatus comprising a processing element 1000 (e.g. a CPU or GPU) comprising execution circuitry 1001 for executing processing operations in response to decoded program instructions. The processing element 1000 has access to a L1D cache 1002 and a L2 cache 1004, which are part of a cache hierarchy of multiple caches for caching data from memory that is accessible by the processing element 1000 in response to load/store operations executed by the execution circuitry 1001. The prediction circuitry 300, the MRT 410, the control circuitry 40 and the extended store buffer 710 may be incorporated in the execution circuitry of the processing element 1000 as part of the CPU or GPU in order to facilitate load-store renaming operations during the execution of one or more sequences of instructions by the processing element.

Figure 17:
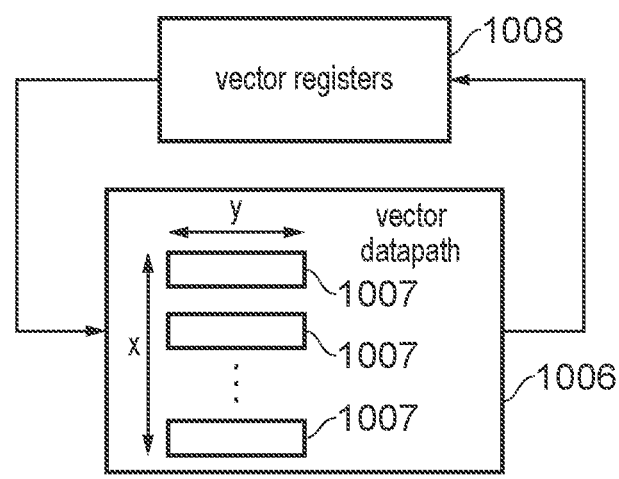
FIG. 17 schematically illustrates a vector datapath according to some configurations of the present techniques.

FIG. 17 illustrates an example of a vector datapath 1006 that may be provided as part of the execution circuitry 1001 of the processing element 1000, and vector registers 1008 for storing vector operands for processing by the vector datapath 1006. Vector operands read from the vector registers 1008 are processed by the vector datapath 1006 to generate vector results which may be written back to the vector registers 1008. The vector datapath 1006 is an XxY bit vector datapath, comprising X vector processing units 1007 each configured to perform vector operations on Y bit vectors. The vector registers 1008 may be accessible as Z bit vector registers, where Z can be equal to Y or different to Y. For a vector operation requiring a Z-bit vector operand where Z is greater than Y, the Z-bit vector operand can be processed using two or more vector processing units 1007 operating in parallel on different portions of the Z-bit vector operand in the same cycle and/or using multiple passes through the vector datapath in two or more cycles. For vector operations requiring a Z-bit vector operand where Z is less than Y, a given vector processing unit 1007 can process two or more vectors in parallel.

In brief overall summary there is provided an apparatus comprising decoder circuitry to decode store instructions and load instructions. The apparatus includes decoder circuitry to decode store instructions and load instructions. The apparatus also includes prediction circuitry to store load predictions and store predictions. Each load prediction is indexed based on a program counter value of one of the load instructions and comprises information indicative of a predicted store instruction predicted to store data to memory to be subsequently loaded from the memory by that load instruction. Each store prediction is indexed based on the program counter value of one of the store instructions and comprises information indicative of the store instruction being predicted to be indicated as the predicted store instruction in at least one of the plurality of load predictions. Conditions for maintaining the load predictions are different from conditions for maintaining the store predictions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:
  decoder circuitry configured to decode store instructions and to decode load instructions;
  prediction circuitry configured to store a plurality of load predictions and a plurality of store predictions, each of the plurality of load predictions indexed based on a program counter value of one of the load instructions and comprising information indicative of a predicted store instruction predicted to store data to memory to be subsequently loaded from the memory by that one of the load instructions, each of the plurality of store predictions indexed based on the program counter value of one of the store instructions and comprising information indicative of that one of the store instructions being predicted to be indicated as the predicted store instruction in at least one of the plurality of load predictions,
  wherein conditions for maintaining the plurality of load predictions are different from conditions for maintaining the plurality of store predictions.

Clause 2. The apparatus of clause 1, comprising control circuitry configured to:
  trigger allocation of a new load prediction in the prediction circuitry in response to a load allocation determination that one of the load instructions having a program counter value that misses in the prediction circuitry loads data that has been stored by a preceding store instruction identified from a group of recently executed store instructions; and
  trigger allocation of a store prediction into the prediction circuitry in response to a store allocation determination that a load forwarding condition is met by an executed load instruction having a program counter value that hits on a previously allocated load prediction of the plurality of load predictions.

Clause 3. The apparatus of clause 1 or clause 2, wherein:
  the decoder circuitry is responsive to receipt of one of the store instructions, to trigger a store prediction lookup in the prediction circuitry and to mark that one of the store instructions as being in a predicted store state in response to the store prediction lookup hitting in the prediction circuitry; and the apparatus comprises storage circuitry to store a memory rename table comprising rename table entries, each of the rename table entries identifying one of the store instructions marked as being in the predicted store state, and associating that one of the store instructions with a source physical register identified by that one of the store instructions.

Clause 4. The apparatus of clause 3, comprising rename circuitry responsive to receipt of one of the store instructions marked as being in the predicted store state, to trigger allocation of an entry in the rename table specifying the source physical register identified by that one of the store instructions.

Clause 5. The apparatus of clause 4, wherein the rename circuitry is responsive to receipt of one of the store instructions which has not been marked being in the predicted store state, to omit allocation of the entry in the memory rename table.

Clause 6. The apparatus of any of clauses 3 to 5, wherein the rename circuitry is responsive to receipt of one of the store instructions, prior to performing any allocation associated with that one of the store instructions, to perform a rename lookup in the rename table and to trigger invalidation of an existing entry in the rename table identified in the rename lookup.

Clause 7. The apparatus of clause 2 or any of clauses 3 to 6 when dependent on clause 2, wherein:
the prediction circuitry is configured to store, for each one of the plurality of load predictions, prediction state information identifying whether that one of the load predictions is in a predictive state; and
the load forwarding condition requires that the previously allocated load prediction is in the predictive state.

Clause 8. The apparatus of clause 7, wherein the decoder circuitry is configured:
in response to receipt of a load instruction of the load instructions, to trigger a load prediction lookup in the prediction circuitry; and
in response to the load prediction lookup resulting in a hit one of the plurality of load predictions in the predictive state, to mark the load instruction as being in a predicted load state and to associate the information indicative of the predicted store instruction identified in that one of the plurality of load predictions with the load instruction.

Clause 9. The apparatus of clause 8 when dependent on clause 4, wherein:
the rename circuitry is responsive to receipt of the load instruction marked as being in the predicted load state to perform a load rename lookup in the memory rename table based on the information indicative of the predicted store instruction associated with the load instruction;
the rename circuitry is responsive to the load rename lookup hitting on a target entry in the memory rename table, to set a destination physical register of the load instruction to the source physical register identified in the target entry; and
the rename circuitry is responsive to the load rename lookup missing in the memory rename table, to mark the load instruction as being in a store-allocate state.

Clause 10. The apparatus of any of clauses 3 to 9, wherein:
the memory rename table is configured as a set associative storage structure having associativity greater than one;
each of the entries of the memory rename table is tagged based on the information indicative of the one of the predicted store instructions indicated in that one of the entries.

Clause 11. The apparatus of any of clauses 2 to 10, wherein the load forwarding condition requires a confirmation that the executed load instruction loads data that has been stored by the predicted store instruction indicated in the previously allocated load prediction.

Clause 12. The apparatus of clause 11, comprising a store buffer configured to store, as the group of recently executed store instructions, pending store request information of each pending store instruction, the pending store request information comprising a memory address to which that pending store instruction stores data, wherein the confirmation is determined through comparison of the predicted store instruction indicated in the previously allocated load prediction with the pending store request information.

Clause 13. The apparatus of clause 12, wherein the control circuitry is configured to perform the load allocation determination based on analysis of at least partial execution of the load instructions to determine whether the data written by one of the store instructions is read by the load instructions based on the memory address comprised in the pending store request information of each pending store instruction.

Clause 14. The apparatus of clause 12 or clause 13, wherein the control circuitry is configured to perform the store allocation determination based on an identification that the executed load instruction is indicated as being in the store-allocate state and that the executed load instruction reads data written by the predicted store instruction indicated in the executed load instruction.

Clause 15. The apparatus of any of clauses 12 to 14, wherein:
the control circuitry is responsive to the load prediction being in a predicted store state, to determine whether the load prediction is accurate through comparison of the load prediction and the pending store request information; and
the control circuitry is responsive to a determination that the load prediction is accurate, to cancel execution of the load instruction.

Clause 16. The apparatus of clause 15, wherein the control circuitry is responsive to a determination that the load prediction is not accurate to signal a misprediction and to flush the load instruction; and
the prediction circuitry is responsive to the misprediction, to cause the load prediction to transition out of the predicted store state.

Clause 17. The apparatus of any of clauses 11 to 15, wherein the store buffer is configured to store, for each pending store instruction indicated in one of the plurality of store predictions, predicted store identifying information.

Clause 18. The apparatus of any of clauses 12 to 17, wherein:
the store buffer comprises an extended store buffer configured to retain completed store request information of one or more completed store instructions;
the control circuitry is configured to determine whether the data written by one of the store instructions is read by the load instructions based on the memory address comprised in the completed store request information of each of the one or more completed store instructions; and the control circuitry is configured:
to allocate the completed store request information to the extended store buffer when allocation of the completed store request will result in at least one entry of the extended store buffer comprising the predicted store identifying information; and
to omit allocation of the completed store request information to the extended buffer storage when allocation of the completed store request will result in no entries of the extended store buffer comprising the predicted store identifying information.

Clause 19. The apparatus of any preceding clause, comprising execution circuitry comprising a 6x128 bit vector datapath.

Clause 20. A system comprising:
the apparatus of any preceding clause, implemented in at least one packaged chip;
at least one system component; and
a board,
wherein the at least one packaged chip and the at least one system component are assembled on the board.

Clause 21. A chip-containing product comprising the system of clause 19 assembled on a further board with at least one other product component.

Clause 22. A method comprising:
decoding store instructions and decoding load instructions;
storing a plurality of load predictions and a plurality of store predictions, each of the plurality of load predictions indexed based on a program counter value of one of the load instructions and comprising information indicative of a predicted store instruction predicted to store data to memory to be subsequently loaded from the memory by that one of the load instructions, each of the plurality of store predictions indexed based on the program counter value of one of the store instructions and comprising information indicative of that one of the store instructions being predicted to be indicated as the predicted store instruction in one of the plurality of load predictions,
wherein conditions for maintaining the plurality of load predictions are different from conditions for maintaining the plurality of store predictions.

Clause 23. A non-transitory computer-readable medium to store computer-readable code for fabrication of the apparatus of any of clauses 1 to 21.

We claim:

1. An apparatus comprising:
decoder circuitry, implemented using hardware, configured to decode store instructions and to decode load instructions; and
prediction circuitry configured to store a plurality of load predictions and a plurality of store predictions, each of the plurality of load predictions indexed based on a program counter value of one of the load instructions and comprising information indicative of a predicted store instruction predicted to store data to memory to be subsequently loaded from the memory by that one of the load instructions, each of the plurality of store predictions indexed based on a program counter value of one of the store instructions and comprising information indicative of that one of the store instructions being predicted to be indicated as the predicted store instruction in at least one of the plurality of load predictions,
wherein conditions for maintaining the plurality of load predictions are different from conditions for maintaining the plurality of store predictions.

2. The apparatus of claim 1, comprising control circuitry configured to:
trigger allocation of a new load prediction in the prediction circuitry in response to a load allocation determination that one of the load instructions having a program counter value that misses in the prediction circuitry loads data that has been stored by a preceding store instruction identified from a group of recently executed store instructions; and
trigger allocation of a store prediction into the prediction circuitry in response to a store allocation determination that a load forwarding condition is met by an executed load instruction having a program counter value that hits on a previously allocated load prediction of the plurality of load predictions.

3. The apparatus of claim 2, wherein:
the prediction circuitry is configured to store, for each one of the plurality of load predictions, prediction state information identifying whether that one of the load predictions is in a predictive state; and
the load forwarding condition requires that the previously allocated load prediction is in the predictive state.

4. The apparatus of claim 3, wherein the decoder circuitry is configured:
in response to receipt of a load instruction of the load instructions, to trigger a load prediction lookup in the prediction circuitry; and
in response to the load prediction lookup resulting in a hit one of the plurality of load predictions in the predictive state, to mark the load instruction as being in a predicted load state and to associate the information indicative of the predicted store instruction identified in that one of the plurality of load predictions with the load instruction.

5. The apparatus of claim 4, wherein:
the decoder circuitry is responsive to receipt of one of the store instructions, to trigger a store prediction lookup in the prediction circuitry and to mark that one of the store instructions as being in a predicted store state in response to the store prediction lookup hitting in the prediction circuitry;
the apparatus comprises storage circuitry to store a memory rename table comprising rename table entries, each of the rename table entries identifying one of the store instructions marked as being in the predicted store state, and associating that one of the store instructions with a source physical register identified by that one of the store instructions;
the apparatus comprises rename circuitry responsive to receipt of one of the store instructions marked as being in the predicted store state, to trigger allocation of an entry in the memory rename table specifying the source physical register identified by that one of the store instructions;
the rename circuitry is responsive to receipt of the load instruction marked as being in the predicted load state to perform a load rename lookup in the memory rename table based on the information indicative of the predicted store instruction associated with the load instruction;

the rename circuitry is responsive to the load rename lookup hitting on a target entry in the memory rename table, to set a destination physical register of the load instruction to the source physical register identified in the target entry; and the rename circuitry is responsive to the load rename lookup missing in the memory rename table, to mark the load instruction as being in a store-allocate state.

6. The apparatus of claim 2, wherein the load forwarding condition requires a confirmation that the executed load instruction loads data that has been stored by the predicted store instruction indicated in the previously allocated load prediction.

7. The apparatus of claim 6, comprising a store buffer configured to store, as the group of recently executed store instructions, pending store request information of each pending store instruction, the pending store request information comprising a memory address to which that pending store instruction stores data, wherein the confirmation is determined through comparison of the predicted store instruction indicated in the previously allocated load prediction with the pending store request information.

8. The apparatus of claim 7, wherein the control circuitry is configured to perform at least one of:

the load allocation determination based on analysis of at least partial execution of the load instructions to determine whether the data stored to the memory by one of the store instructions is read by the load instructions based on the memory address comprised in the pending store request information of each pending store instruction; and the store allocation determination based on an identification that the executed load instruction is indicated as being in a store-allocate state and that the executed load instruction reads data stored to the memory by the predicted store instruction indicated in the executed load instruction.

9. The apparatus of claim 7, wherein:

the control circuitry is responsive to the load prediction being in a predicted load state, to determine whether the load prediction is accurate through comparison of the load prediction and the pending store request information; and the control circuitry is responsive to a determination that the load prediction is accurate, to cancel execution of the load instruction.

10. The apparatus of claim 7, wherein:

the store buffer comprises an extended store buffer configured to retain completed store request information of one or more completed store instructions;

the control circuitry is configured to determine whether the data stored to the memory by one of the store instructions is read by the load instructions based on the memory address comprised in the completed store request information of each of the one or more completed store instructions; and the control circuitry is configured:

to allocate the completed store request information to the extended store buffer when allocation of the completed store request information will result in at least one entry of the extended store buffer comprising the predicted store identifying information; and to omit allocation of the completed store request information to the extended buffer storage when allocation of the completed store request will result in no entries of the extended store buffer comprising the predicted store identifying information.

11. The apparatus of claim 1, wherein:

the decoder circuitry is responsive to receipt of one of the store instructions, to trigger a store prediction lookup in the prediction circuitry and to mark that one of the store instructions as being in a predicted store state in response to the store prediction lookup hitting in the prediction circuitry; and the apparatus comprises storage circuitry to store a memory rename table comprising rename table entries, each of the rename table entries identifying one of the store instructions marked as being in the predicted store state, and associating that one of the store instructions with a source physical register identified by that one of the store instructions.

12. The apparatus of claim 11, comprising rename circuitry responsive to receipt of one of the store instructions marked as being in the predicted store state, to trigger allocation of an entry in the memory rename table specifying the source physical register identified by that one of the store instructions.

13. The apparatus of claim 12, wherein the rename circuitry is responsive to receipt of one of the store instructions which has not been marked as being in the predicted store state, to omit allocation of an entry in the memory rename table.

14. The apparatus of claim 12, wherein the rename circuitry is responsive to receipt of one of the store instructions, prior to performing any allocation associated with that one of the store instructions, to perform a rename lookup in the memory rename table and to trigger invalidation of an existing entry in the memory rename table identified in the rename lookup.

15. The apparatus of claim 11, wherein:

the memory rename table is configured as a set associative storage structure having associativity greater than one; and each of the entries of the memory rename table is tagged based on the information indicative of the one of the predicted store instructions indicated in that one of the entries.

16. The apparatus of claim 1, comprising execution circuitry comprising a 6x128 bit vector datapath.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17 assembled on a further board with at least one other product component.

19. A method comprising:

decoding store instructions and decoding load instructions; and storing a plurality of load predictions and a plurality of store predictions, each of the plurality of load predictions indexed based on a program counter value of one of the load instructions and comprising information indicative of a predicted store instruction predicted to store data to memory to be subsequently loaded from the memory by that one of the load instructions, each of the plurality of store predictions indexed based on a program counter value of one of the store instructions and comprising information indicative of that one of the store instructions being predicted to be indicated as the predicted store instruction in at least one of the plurality of load predictions, wherein conditions for maintaining the plurality of load predictions are different from conditions for maintaining the plurality of store predictions.

20. A non-transitory computer-readable medium to store computer-readable code for fabrication of an apparatus comprising:

decoder circuitry, implemented using hardware, configured to decode store instructions and to decode load instructions; and prediction circuitry configured to store a plurality of load predictions and a plurality of store predictions, each of the plurality of load predictions indexed based on a program counter value of one of the load instructions and comprising information indicative of a predicted store instruction predicted to store data to memory to be subsequently loaded from the memory by that one of the load instructions, each of the plurality of store predictions indexed based on a program counter value of one of the store instructions and comprising information indicative of that one of the store instructions being predicted to be indicated as the predicted store instruction in at least one of the plurality of load predictions, wherein conditions for maintaining the plurality of load predictions are different from conditions for maintaining the plurality of store predictions.

* * * * *